(12) United States Patent
Wu et al.

(10) Patent No.: US 11,625,576 B2
(45) Date of Patent: Apr. 11, 2023

(54) SYSTEMS AND METHODS FOR IMAGE STYLE TRANSFORMATION

(71) Applicant: SHANGHAI UNITED IMAGING INTELLIGENCE CO., LTD., Shanghai (CN)

(72) Inventors: Ziyan Wu, Cambridge, MA (US); Srikrishna Karanam, Cambridge, MA (US); Arun Innanje, Cambridge, MA (US)

(73) Assignee: SHANGHAI UNITED IMAGING INTELLIGENCE CO., LTD., Shanghai (CN)

( * ) Notice: Subject to any disclaimer, the term of this patent is extended or adjusted under 35 U.S.C. 154(b) by 619 days.

(21) Appl. No.: 16/685,802

(22) Filed: Nov. 15, 2019

(65) Prior Publication Data

US 2021/0150310 A1  May 20, 2021

(51) Int. Cl.
*G06T 11/60*   (2006.01)
*G06N 3/04*   (2023.01)
*G06T 7/30*   (2017.01)
*G06N 3/08*   (2023.01)

(52) U.S. Cl.
CPC ............ *G06N 3/0454* (2013.01); *G06N 3/08* (2013.01); *G06T 7/30* (2017.01); *G06T 11/60* (2013.01); *G06T 2207/20081* (2013.01); *G06T 2207/20084* (2013.01)

(58) Field of Classification Search
CPC .......... G06N 3/0454; G06N 3/08; G06T 7/30; G06T 11/60; G06T 2207/20081; G06T 2207/20084
See application file for complete search history.

(56) References Cited

U.S. PATENT DOCUMENTS 9,857,953 B2 *  1/2018  Sunkavalli .......... G06F 3/04845
2019/0370936 A1 * 12/2019  Zhang ................. G06K 9/6232

OTHER PUBLICATIONS

Ian J. Goodfellow et al., Generate Adversarial Nets, in Advances in neural information processing systems, 2672-2680, 2014.
Jun-Yan Zhu et al., Unpaired Image-to-Image Translation using Cycle-Consistent Adversarial Networks, in Proceedings of the IEEE international conference on computer vision, 2223-2232, 2017.

* cited by examiner

*Primary Examiner* — Antonio A Caschera
(74) *Attorney, Agent, or Firm* — Metis IP LLC

(57) ABSTRACT

A method for image processing may include: obtaining an original image of a first style, the original image being generated by a first imaging device; obtaining a target transformation model; and generating a transferred image of a second style by transferring the first style of the original image using the target transformation model. The second style may be substantially similar to a target style of one or more other images generated by a second imaging device. The second style may be different from the first style.

16 Claims, 12 Drawing Sheets

SYSTEMS AND METHODS FOR IMAGE STYLE TRANSFORMATION

TECHNICAL FIELD

The present disclosure generally relates to image processing, and more specifically relates to systems and methods for image style transformation.

BACKGROUND

With rapid developments of imaging technology, the upgrading of imaging devices becomes more frequent. The style of images generated by a newly adopted imaging device can have differences, e.g., perceptual differences, in comparison with the style of images generated by a previously existing device to which a user is accustomed. Due to the differences in the image style between the newly adopted imaging device and the previously existing device, a user may need to spend extra time and effort on interpreting an image generated by the newly adopted imaging device and getting used to the image style of the newly adopted imaging device, and thus hindering a wide adoptability of new imaging devices. Therefore, it is desirable to provide systems and methods for automatically transform a perceptual style of images facilitate a smoother transition for users adapting to a new imaging device.

SUMMARY

In one aspect of the present disclosure, a method for image processing is provided. The method may be implemented on at least one machine each of which has at least one processor and at least one storage device. The method may include: obtaining an original image of a first style, the original image being generated by a first imaging device; obtaining a target transformation model; and generating a transferred image of a second style by transferring the first style of the original image using the target transformation model. The second style may be substantially similar to a target style of one or more other images generated by a second imaging device. The second style may be different from the first style.

In some embodiments, the obtaining of an original image may include: obtaining the original image based on a first instruction of a user, the first instruction including information of a target style specified by the user via a user interface.

In some embodiments, the obtaining of a target transformation model may include: obtaining, via a user interface, information of the second imaging device; and selecting, according to the information of the second imaging device, from two or more trained transformation models, the target transformation model corresponding to the target style.

In some embodiments, the method may further include: obtaining login information of a user.

In some embodiments, the obtaining of a target transformation model may include: identifying, according to the login information of the user, from two or more trained transformation models, a trained transformation model corresponding to the user as the target transformation model.

In some embodiments, the obtaining of a target transformation model may include: determining the target transformation model based on a second instruction of a user. The second instruction may be associated with one or more trained transformation models provided or selected by the user via a user interface.

In some embodiments, the method may further include: determining a scanning protocol of the original image.

In some embodiments, the obtaining of a target transformation model may include: identifying, according to the scanning protocol of the original image, from two or more trained transformation models, the target transformation model corresponding to a scan region of the scanning protocol.

In some embodiments, the obtaining of a target transformation model may include: recognizing a scan region of the original image; identifying, according to the scan region, from two or more trained transformation models, the target transformation model corresponding to the scan region.

In some embodiments, the target transformation model may be generated according to a first process, the first process may include: obtaining first information associated with a first imaging device that generates the original image; obtaining second information associated with at least one second imaging device, wherein the at least one second imaging device may generate images to which a user is accustomed; determining a pre-trained transformation model based on at least a portion of the first information or at least a portion of the second information; obtaining one or more reference images; and generating the target transformation model by training, based on at least a portion the first information or at least a portion the second information, the pre-trained transformation model using the one or more reference images.

In some embodiments, the pre-trained transformation model may be generated according to a second process. The second process may include: obtaining a first set of images generated by the first imaging device; obtaining a second set of images generated by one or more of the at least one second imaging device; obtaining an initial transformation model; and generating the pre-trained transformation model by training the initial transformation model using the first set of images and the second set of images.

In some embodiments, the first information may include at least one of a model identification number of the first imaging device; or one or more settings relating to an image style associated with the first imaging device provided by the user.

In some embodiments, the one or more settings may include an amount or extent of image style transformation from the first style to a target style or to the second style.

In some embodiments, the second information may include at least one of a model identification number of each of the at least one second imaging device; a time length that the user has been using each of the at least one second imaging device; or a ranking of the at least one second imaging device based on a preference of the user.

In some embodiments, the target transformation model may be generated according to a third process. The third process may include: obtaining one or more reference images; obtaining a first set of images generated by a first imaging device that generates the original image; obtaining a second set of images generated by at least one second imaging device, wherein the at least one second imaging device may generate images to which a user is accustomed; obtaining an initial transformation model; and generating the target transformation model by training the initial transformation model using the first set of images, the second set of images, and the one or more reference images.

In some embodiments, the third process may further include: obtaining first information of the first imaging device; obtaining second information of the at least one second imaging device; and training, based on the first information or the second information, the initial transformation model.

In some embodiments, the obtaining a target transformation model may include: obtaining a sample image of the first style; generating a transferred sample image of the second style by transferring the first style of the sample image using the target transformation model; providing the transferred sample image to a user via a user interface; receiving a feedback from the user via the user interface; determining, based on the feedback, whether the transferred sample image is verified by the user; and in response to a determination that the transferred sample image is verified by the user, finalizing the target transformation model; or in response to a determination that the transferred sample image is rejected by the user, updating, re-training, or replacing the target transformation model.

In some embodiments, the target transformation model may be a generative adversarial network (GAN) model or a cycle-GAN model.

In another aspect of the present disclosure, a system for image processing is provided. The system may include: at least one storage device storing a set of instructions; and at least one processor in communication with the storage device. When executing the set of instructions, the at least one processor may be configured to cause the system to perform operations including: obtaining an original image of a first style, the original image being generated by a first imaging device; obtaining a target transformation model; and generating a transferred image of a second style by transferring the first style of the original image using the target transformation model, the second style being substantially similar to a target style of one or more other images generated by a second imaging device, the second style being different from the first style.

In another aspect of the present disclosure, a non-transitory computer readable medium storing instructions is provided. The instructions, when executed by at least one processor, may cause the at least one processor to implement a method including: obtaining an original image of a first style, the original image being generated by a first imaging device; obtaining a target transformation model; and generating a transferred image of a second style by transferring the first style of the original image using the target transformation model. The second style may be substantially similar to a target style of one or more other images generated by a second imaging device. The second style may be different from the first style.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise,"

"comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that the term "object" and "subject" may be used interchangeably as a reference to a thing that undergoes a treatment and/or an imaging procedure in a radiation system of the present disclosure.

It will be understood that the term "system," "engine," "unit," "module," and/or "block" used herein are one method to distinguish different components, elements, parts, section or assembly of different level in ascending order. However, the terms may be displaced by another expression if they achieve the same purpose.

Figure 2:
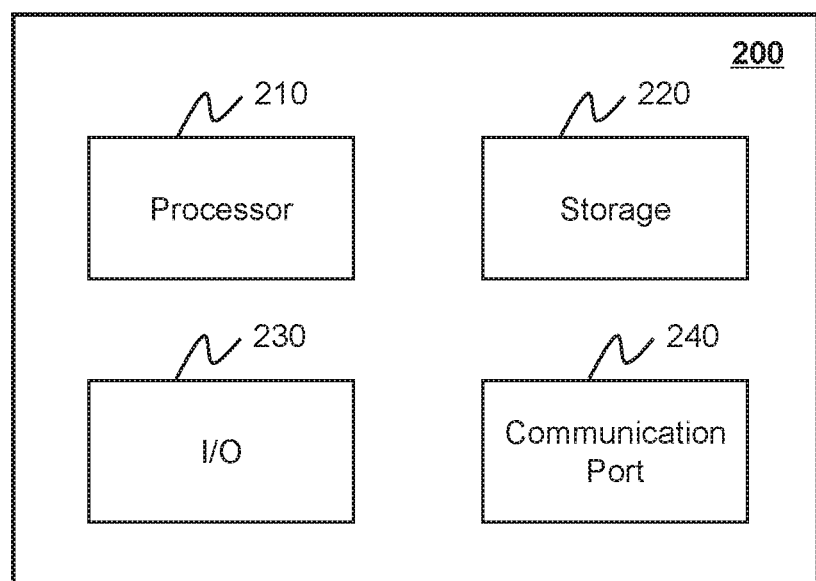
FIG. 2 is a schematic diagram illustrating exemplary hardware and software components of a computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may apply to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood the operations of the flowcharts may be implemented not in order. Conversely, the operations may be implemented in inverted order, or simultaneously. Moreover, one or more other operations may be added to the flowcharts. One or more operations may be removed from the flowcharts.

Commercially available imaging devices may produce images of a certain style to which users are accustomed. If a new imaging vendor comes out with a new imaging device, the images that the new imaging device produces may have one or more differences compared to images generated by a previously existing imaging device to which the users are accustomed, due to one or more factors including, e.g., different algorithms used in reconstruction, enhancement and/or other post-processing techniques used. This may hinder wide adoptability of the new imaging device since the users may be uncomfortable or perceptually unaccustomed to interpret images generated by the new imaging device. To facilitate a smoother transition for the users to adapt to the new imaging device, systems and methods that provide a tool configured to automatically transform the perceptual style of images generated by the new imaging device so that transferred images look similar to the images generated by an imaging device to which the users are accustomed. In some embodiments, imaging device manufacturers may provide options for users to adjust certain parameters in the image reconstruction, enhancement, and/or post-processing operations so that the perceptual style of the images generated by the new imaging device can be changed accordingly. However, adjusting the parameters to match a certain image style of an imaging device of a specific model to which the users are accustomed may be non-trivial and time-consuming, especially when reference images (see, e.g., FIG. 6) generated by the model of the imaging device to which the users are accustomed are missing.

The present disclosure relates to systems and methods for image style transformation, which may obtain an original image, determine a target transformation model, generate a transferred image, and/or provide the transferred image to a user. In the present disclosure, based on the target transformation model, the transferred image that has the same style as or similar style to an image generated by an imaging device to which the user is accustomed may be obtained. The systems and methods may be provided as an add-on to any new imaging device, providing imaging device manufacturer(s) and/or users the flexibility to conveniently adopt the systems and methods as described herein without significant changes to the design or configurations of the new imaging device.

Figure 1:
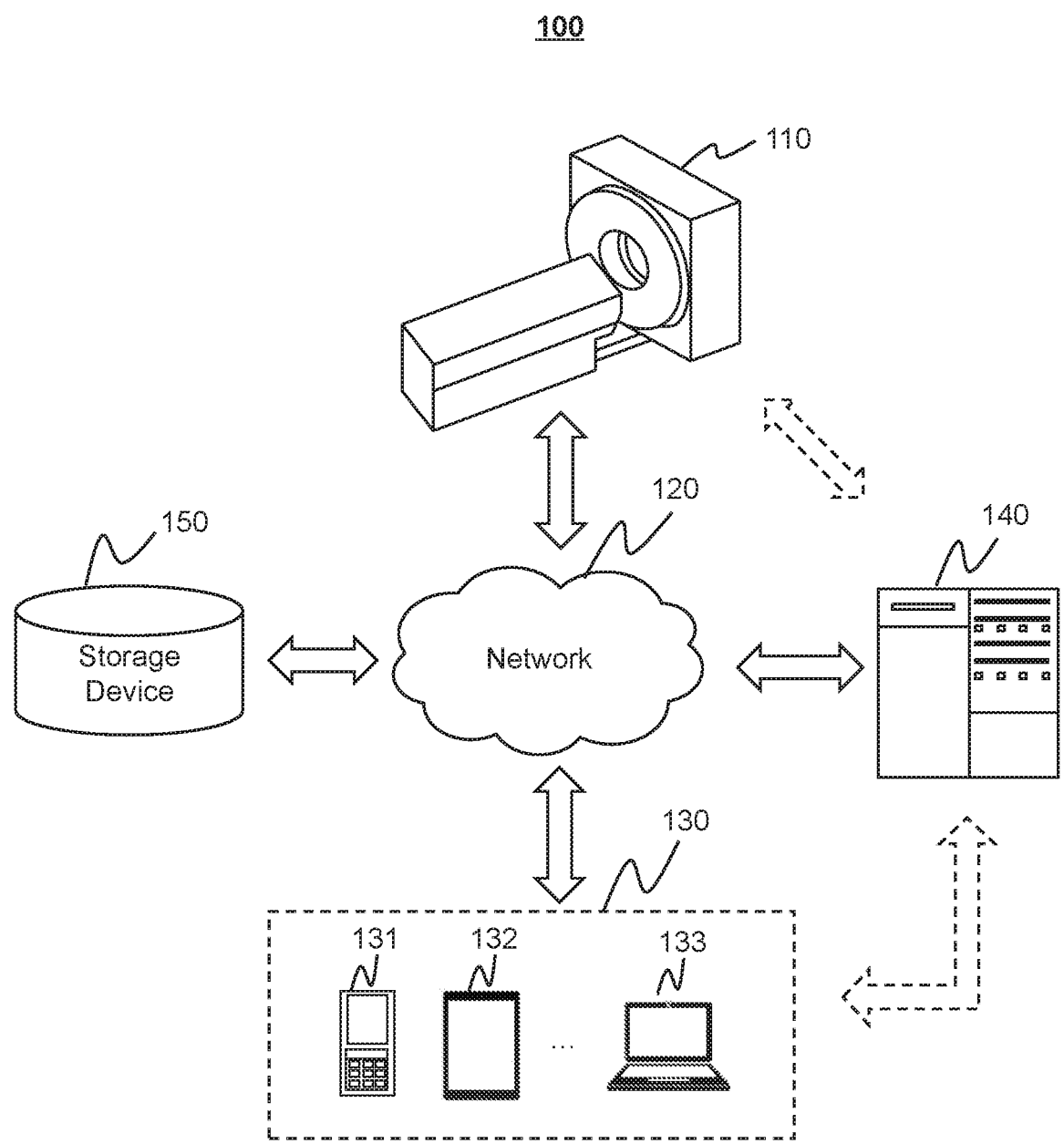
FIG. 1 is a schematic diagram illustrating an exemplary imaging system according to some embodiments of the present disclosure.

FIG. 1 is a schematic diagram illustrating an exemplary imaging system according to some embodiments of the present disclosure. As shown in FIG. 1, the imaging system 100 may include a scanner 110, a network 120, one or more terminals 130, a processing device 140, and a storage device 150. The components in the imaging system 100 may be connected in one or more of various ways. Merely by way of example, the scanner 110 may be connected to the processing device 140 through the network 120. As another example, the scanner 110 may be connected to the processing device 140 directly as indicated by the bi-directional arrow in dotted lines linking the scanner 110 and the processing device 140. As still another example, the storage device 150 may be connected to the processing device 140 directly or through the network 120. As still another example, the terminal 130 may be connected to the processing device 140 directly (as indicated by the bi-directional arrow in dotted lines linking the terminal 130 and the processing device 140) or through the network 120.

The scanner 110 may scan an object and/or generate scan data relating to the object. In some embodiments, the scanner 110 may be a single-modality medical imaging device (e.g., a magnetic resonance imaging (MRI) device, a positron emission tomography (PET) device, a single-photon emission computed tomography (SPECT) device, a computed tomography (CT) device, or the like) or a multi-modality medical imaging device (e.g., a PET-MRI device, a SPECT-MRI device, or a PET-CT device). In some embodiments, the scanner 110 may include a gantry configured to image the object, a scan region configure to accommodate the object, and/or a scanning bed configured to support the object during an imaging process. The scanning bed may support the object during scanning. For example, the object may be supported and/or delivered to the scan region of the gantry by the scanning bed. In some embodiments, the scanner 110 may transmit image(s) via the network 120 to the processing device 140, the storage device 150, and/or the terminal(s) 130. For example, the image(s) may be sent to the processing device 140 for further processing or may be stored in the storage device 150.

In some embodiments, the object may be biological or non-biological. Merely by way of example, the object may include a patient, an organ, a tissue, a specimen, a man-made object, a phantom, etc. In some embodiments, the object to be scanned (also referred to as imaged) may include a body, substance, or the like, or any combination thereof. In some embodiments, the object may include a specific portion of a body, such as a head, a thorax, an abdomen, or the like, or any combination thereof. In some embodiments, the object may include a specific organ, such as a breast, an esophagus, a trachea, a bronchus, a stomach, a gallbladder, a small intestine, a colon, a bladder, a ureter, a uterus, a fallopian tube, etc. In the present disclosure, "object" and "subject" are used interchangeably.

The network 120 may include any suitable network that can facilitate the exchange of information and/or data for the imaging system 100. In some embodiments, one or more components of the imaging system 100 (e.g., the scanner 110, the terminal 130, the processing device 140, the storage device 150, etc.) may communicate information and/or data with one or more other components of the imaging system 100 via the network 120. For example, the processing device 140 may obtain image data from the scanner 110 via the network 120. As another example, the processing device 140 may obtain user instructions from the terminal 130 via the network 120. The network 120 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the imaging system 100 may be connected to the network 120 to exchange data and/or information.

The terminal(s) 130 may include a mobile device 131, a tablet computer 132, a laptop computer 133, or the like, or any combination thereof. In some embodiments, the mobile device 131 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, a footgear, eyeglasses, a helmet, a watch, clothing, a backpack, a smart accessory, or the like, or any combination thereof. In some embodiments, the mobile device may include a mobile phone, a personal digital assistant (PDA), a gaming device, a navigation device, a point of sale (POS) device, a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the terminal(s) 130 may be part of the processing device 140.

The processing device 140 may process data and/or information obtained from the scanner 110, the terminal 130, and/or the storage device 150. In some embodiments, the processing device 140 may be a single server or a server group. The server group may be centralized or distributed. In some embodiments, the processing device 140 may be local or remote. For example, the processing device 140 may access information and/or data stored in the scanner 110, the terminal 130, and/or the storage device 150 via the network 120. As another example, the processing device 140 may transfer a style of an image. In some embodiments, the processing device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 140 may be implemented by a computing device 200 having one or more components as illustrated in FIG. 2. In some embodiments, the processing device 140, or a portion of the processing device 140 may be integrated into the scanner 110.

The storage device 150 may store data, instructions, and/or any other information. In some embodiments, the storage device 150 may store data obtained from the terminal 130 and/or the processing device 140. In some embodiments, the storage device 150 may store data and/or instructions that the processing device 140 may execute or use to perform exemplary methods described in the present disclosure. In some embodiments, the storage device 150 may include a mass storage device, removable storage, a volatile read-and-write memory, a read-only memory (ROM), or the like, or any combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memories may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more other components in the imaging system 100 (e.g., the processing device 140, the terminal 130, etc.). One or more components of the imaging system 100 may access the data or instructions stored in the storage device 150 via the network 120. In some embodiments, the storage device 150 may be directly connected to or communicate with one or more other components of the imaging system 100 (e.g., the processing device 140, the terminal 130, etc.). In some embodiments, the storage device 150 may be part of the processing device 140.

FIG. 2 is a schematic diagram illustrating exemplary hardware and software components of a computing device according to some embodiments of the present disclosure. The computing device 200 may be a general purpose computer or a special purpose computer; both may be used to implement an imaging system 100 of the present disclosure. In some embodiments, the processing device 140 may be implemented on the computing device 200, via its hardware, software program, firmware, or a combination thereof. Although only one such computer is shown, for convenience, the computer functions as described herein may be implemented in a distributed manner on a number of similar platforms, to distribute the processing load. As illustrated in FIG. 2, the computing device 200 may include a processor 210, a storage 220, an input/output (I/O) 230, and a communication port 240.

The processor 210 may execute computer instructions (e.g., program code) and perform functions of the processor in accordance with techniques described herein. The computer instructions may include, for example, routines, programs, objects, components, data structures, procedures, modules, and functions, which perform particular functions described herein. For example, the processor 210 may obtain an original image generated by an imaging device (e.g., the scanner 110). In some embodiments, the processor 210 may determine a target transformation model. In some embodiments, the processor 210 may generate a transferred image by transferring a first style of the original image using the target transformation model. In some embodiments, the processor 210 may provide the transferred image to a user.

In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage 220 may store data/information obtained from the scanner 110, the terminal 130, the storage device 150, and/or any other component of the imaging system 100. In some embodiments, the storage 220 may include a mass storage device, a removable storage device, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for performing an image style transfer.

The I/O 230 may input and/or output signals, data, information, etc. In some embodiments, the I/O 230 may enable a user interaction with the processing device 140. In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the network 120) to facilitate data communications. The communication port 240 may establish connections between the processing device 140 and the scanner 110, the terminal 130, and/or the storage device 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
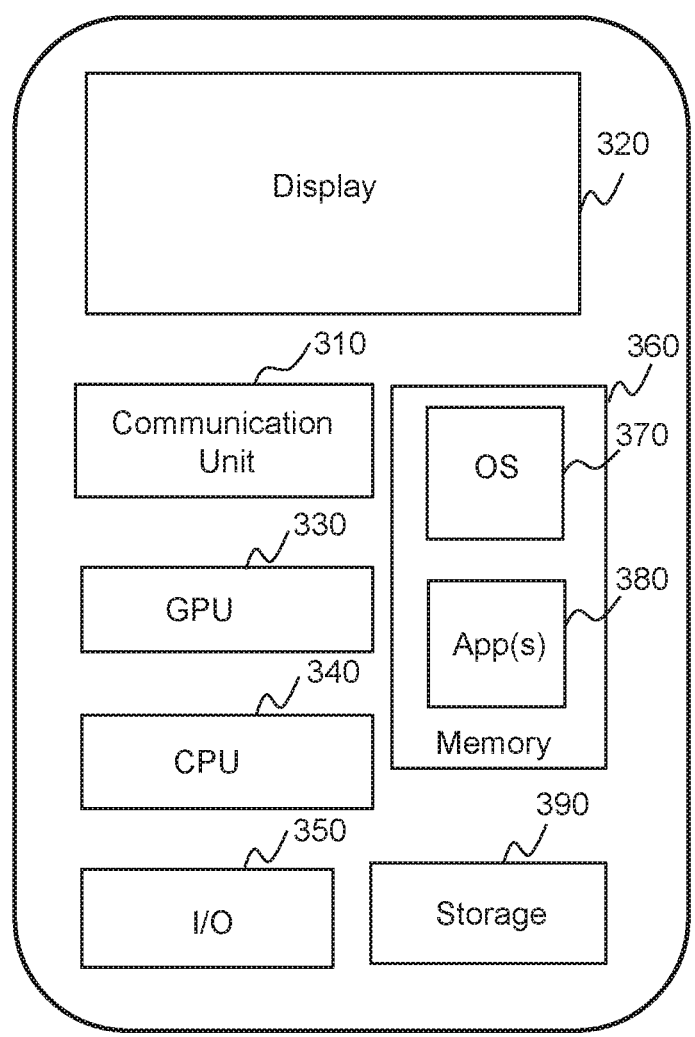
FIG. 3 is a schematic diagram illustrating exemplary hardware and/or software components of an exemplary mobile device that is configured to implement a specific system disclosed in the present disclosure.

FIG. 3 is a schematic diagram illustrating exemplary hardware and/or software components of an exemplary mobile device that is configured to implement a specific system disclosed in the present disclosure. As illustrated in FIG. 3, the mobile device 300 may include a communication unit 310, a display 320, a graphics processing unit (GPU) 330, a CPU 340, an I/O 350, a storage 390, and a memory 360. In some embodiments, any other suitable component, including but not limited to a system bus or a controller (not shown), may also be included in the mobile device 300. In some embodiments, a mobile operating system 370 (e.g., IOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to image processing or other information from the processing device 140. User interactions with the information stream may be achieved via the I/O 350 and provided to the processing device 140 and/or other components of the imaging system 100 via the network 120. In some embodiments, a user may input parameters to the imaging system 100, via the mobile device 300.

In order to implement various modules, units and their functions described above, a computer hardware platform may be used as hardware platforms of one or more elements (e.g., the processing device 140 and/or other components of the imaging system 100 described in FIG. 1). Since these hardware elements, operating systems and program languages are common; it may be assumed that persons skilled in the art may be familiar with these techniques and they may be able to provide information needed in the imaging according to the techniques described in the present disclosure. A computer with the user interface may be used as a personal computer (PC), or other types of workstations or terminal devices. After being properly programmed, a computer with the user interface may be used as a server. It may be considered that those skilled in the art may also be familiar with such structures, programs, or general operations of this type of computing device.

Figure 4A:
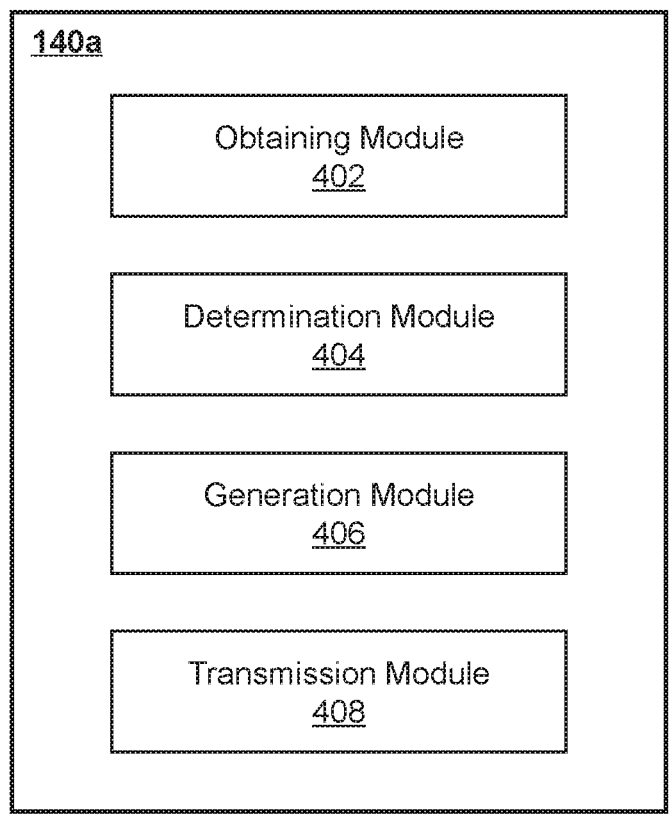
FIGS. 4A and 4B are block diagrams illustrating exemplary processing devices according to some embodiments of the present disclosure.
Figure 4B:
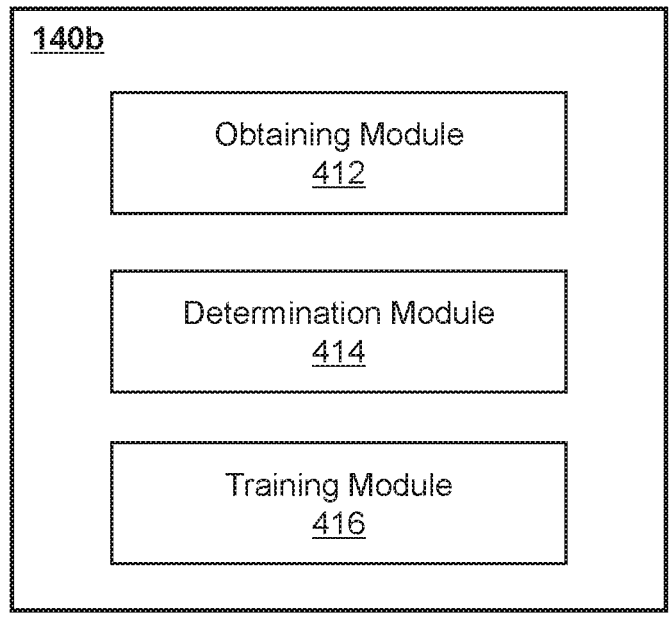

FIGS. 4A and 4B are block diagrams illustrating exemplary processing devices according to some embodiments of the present disclosure. In FIG. 4A, the processing device 140a may include an obtaining module 402, a determination module 404, a generation module 406, and a transmission module 408. In FIG. 4B, the processing device 140b may include an obtaining module 412, a determination module 414, and a training module 416.

In some embodiments, the obtaining module 402 may be configured to obtain one or more original images, first information associated with a first imaging device, second information associated with at least one second imaging device of a second model, one or more reference images, a first set of images generated by a first imaging device, a second set of images generated by one or more second imaging devices, an initial transformation model, one or more sample images, or a target transformation model, or the like, or a combination thereof.

In some embodiments, the determination module 404 may be configured to determine a target transformation model, and/or a pre-trained transformation model. The determination module 404 may determine, based on feedback(s) from a user, whether one or more transferred sample image(s) are verified by the user.

In some embodiments, the generation module 406 may be configured to generate a transferred image, one or more transferred sample images, or a target transformation model, or the like, or a combination thereof.

In some embodiments, the transmission module 408 may be configured to provide one or more transferred images to a user for presentation. In some embodiments, the transmission module 408 may provide one or more sample images to a user. In some embodiments, the transmission module 408 may receive one or more feedbacks from the user.

In some embodiments, the obtaining module 412 may be configured to obtain one or more original images, first information associated with a first imaging device, second information associated with at least one second imaging device of a second model, one or more reference images, a first set of images generated by a first imaging device, a second set of images generated by one or more second imaging devices, an initial transformation model, one or more sample images, or a target transformation model, or the like, or a combination thereof.

In some embodiments, the determination module 414 may be configured to determine a target transformation model, and/or a pre-trained transformation model. In some embodiments, the determination module 414 may determine, based on feedback(s) from a user, whether one or more transferred sample image(s) are verified by the user.

In some embodiments, the training module 416 may be configured to generate the target transformation model by training a pre-trained transformation model or an initial transformation model. In some embodiments, the training module 416 may generate the pre-trained transformation model by training the initial transformation model.

It should be noted that the above description of the processing device 140a and the processing device 140b is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, any one of the modules in FIGS. 4A and 4B may be divided into two or more units. In some embodiments, the processing device 140a and the processing device 140b may share one or more of the modules illustrated above. For instance, the processing devices 140a and 140b may be part of a same system and share a same obtaining module; that is, the obtaining module 402 and the obtaining module 412 are a same module. In some embodiments, the processing device 140a and the processing device 140b may be different devices belonging to different parties. For example, the processing device 140b may be configured to train one or more transformation models offline. As another example, the processing device 140a may be configured to use one or more trained transformation models to transform one or more images online.

Figure 5:
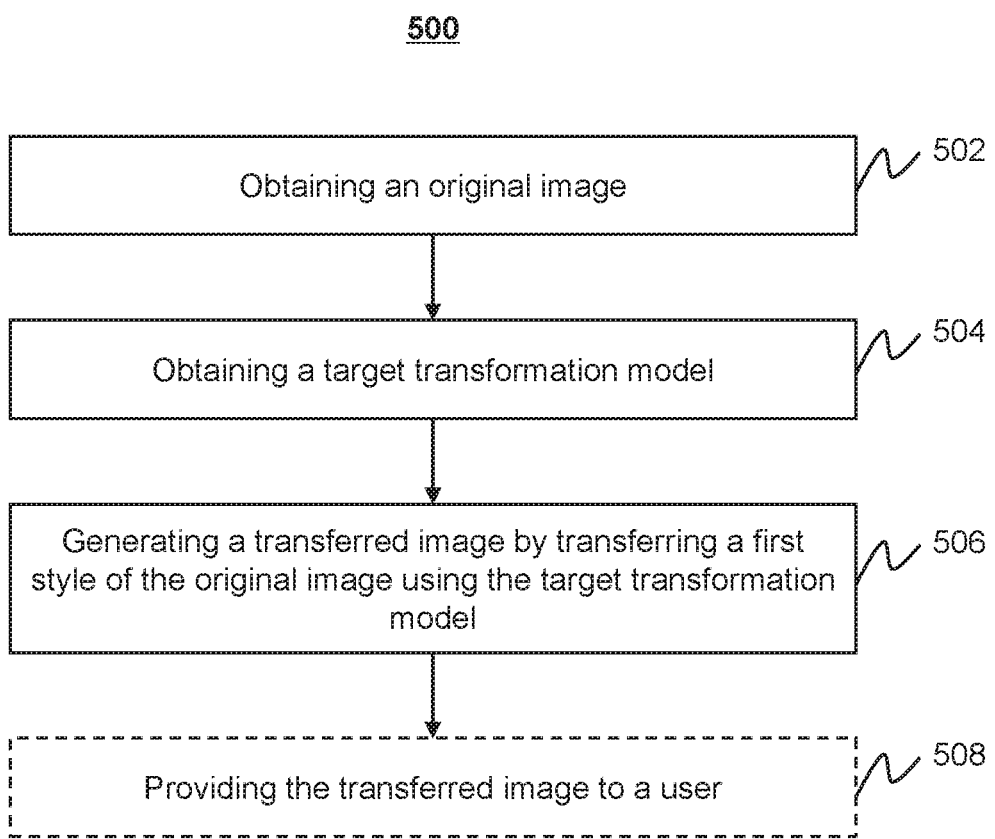
FIG. 5 is a flowchart illustrating an exemplary process for performing an image style transformation according to some embodiments of the present disclosure.

FIG. 5 is a flowchart illustrating an exemplary process for performing an image style transformation according to some embodiments of the present disclosure. In some embodiments, the process 500 may be executed by the imaging system 100. For example, the process 500 may be implemented as a set of instructions (e.g., an application) stored in one or more storage devices (e.g., the storage device 150, the storage 220, and/or the storage 390) and invoked and/or executed by the processing device 140a (implemented on, for example, the processor 210 of the computing device 200, and the CPU 340 of the mobile device 300). The operations of the process 500 presented below are intended to be illustrative. In some embodiments, the process may be accomplished with one or more additional operations not described, and/or without one or more of the operations discussed. Additionally, the order in which the operations of the process 500 as illustrated in FIG. 5 and described below is not intended to be limiting.

In 502, an original image may be obtained. In some embodiments, the processing device 140a (e.g., the obtaining module 402) may perform operation 502. The original image may be an image whose style needs to be transformed. In some embodiments, the original image may be of a first style. In some embodiments, the original image may be a medical image. In some embodiments, the medical image may include data or information corresponding to an object. For example, the medical image may include data or information corresponding to a specific portion of a patient (such as the head, the thorax, the abdomen, and so on), or a specific organ of the patient (such as the esophagus, a trachea, a bronchus, the stomach, the gallbladder, a small intestine, the colon, the bladder, the ureter, a uterus, a fallopian tube, and so on).

As used herein, a representation of an object (e.g., a patient, or a portion thereof) in an image may be referred to the object for brevity. For instance, a representation of an organ or tissue (e.g., the heart, the liver, a lung, etc., of a patient) in an image may be referred to as the organ or tissue for brevity. As used herein, an operation on a representation of an object in an image may be referred to as an operation on the object for brevity. For instance, a segmentation of a portion of an image including a representation of an organ or tissue (e.g., the heart, the liver, a lung, etc., of a patient) from the image may be referred to as a segmentation of the organ or tissue for brevity.

In some embodiments, the original image may be generated by a first imaging device of a first model. In some embodiments, the first imaging device may include an X-ray detector, a computed tomography (CT) device, a magnetic resonance image (MRI) device, a positron emission tomography (PET) device, or the like. An exemplary first imaging device may include the scanner 110 (see FIG. 1). The first model of the first imaging device may be identified based on a model identification number. A model identification number of an imaging device may refer to an identification number of a same type or model of imaging devices. The model identification number may correspond to or be associated with a plurality of imaging devices that are of a same or similar model (or type) as the first imaging device. In some embodiments, the model identification number may be set by a manufacturer of the first imaging device. In some embodiments, the model identification number may be labelled on the first imaging device, e.g., by the manufacturer of the first imaging device. In some embodiments, the model identification number may be set based on a first predetermined rule. For example, the first predetermined rule may specify that the model identification number includes one or more letters, one or more symbols, and/or one or more numbers that represent information of the first imaging device, such as its manufacturer, functions, performance parameters, manufacturing time, batch information, or the like, or any combination thereof.

In some embodiments, after generation, the original image may be stored in one or more storage devices (e.g., the storage device 150, the storage 220, and/or the storage 390) of the imaging system 100 and/or an external data source. Therefore, the processing device 140a may obtain the original image from the storage device(s) or the external data source. In some embodiments, the original image may be automatically obtained when the process 500 is implemented. For example, the original image may be stored in a default folder on a storage device, and the processing device 140a may automatically retrieve the original image from the default folder. The default folder may be determined by the imaging system 100, or may be preset by a user or operator via, e.g., the terminal(s) 130. In some embodiments, the original image may be obtained based on a first instruction of a user (e.g., a doctor, a radiologist, an operator of an imaging device, an expert of an imaging device, or the like). The first instruction may include information of the first style specified by the user via a user interface. The first instruction may be associated with one or more images provided or selected by the user via the user interface. The user interface may be an interactive interface configured to facilitate the receipt and/or performance of instructions associated with one or more operations of the present disclosure. In some embodiments, the user may provide or select one or more images via the user interface. For example, the user interface may present a button, if the user clicks the button by pressing it on a touchscreen or using a mouse, the user interface may present one or more file storage paths to the user, and the user can select a file storage path where the original image is stored (or further select the original image from a plurality of images stored in the file storage path), and the processing device 140a may obtain the original image from the selected file storage path. As another example, the user may provide the original image by operably connecting a storage device that stores the original image with the computing device 200, then the user interface may present the content stored in the storage device to the user, and/or the user may select or identify the original image via the user interface.

In 504, a target transformation model may be obtained. In some embodiments, the processing device 140a (e.g., the determination module 404) may perform operation 504. The target transformation model may be configured to transfer a style of an image (e.g., the original image obtained in 502). A style of an image may relate to one or more formal (or perceptual) features of the image, such as texture, a color, a shape, a spatial relationship, brightness, contrast, sharpness, etc. Images of a same style may have the same or similar formal features. In some embodiments, images generated by different imaging devices of a same model that have the same model identification number may be of the same style. In some embodiments, images generated by different imaging devices of different models that have different model identification numbers may be of different styles. A style transfer of an image may refer to transferring the style of an image to another style (e.g., a desirable target style). In the present disclosure, "style transfer" and "style transformation" are used interchangeably. In some embodiments, the target style may refer to a preferred style of the user and/or a style which the user is accustomed to. In some embodiments, the target style may be associated with a second imaging device. The second imaging device and the first imaging device may have one or more same or similar functions (e.g., CT imaging, MRI imaging, PET imaging, etc.). The second imaging device and the first imaging device may be of different models with different model identification numbers. In some embodiments, the second imaging device and the first imaging device may be from the same or different manufacturers.

In some embodiments, images generated by the second imaging device and images generated by the first imaging device may be of different styles. For example, if the second imaging device and the first imaging device are of a same modality (e.g., CT imaging), but different models and/or different manufacturers, then the images generated by the second imaging device and the images generated by the first imaging device may be of different styles. As another example, if the second imaging device and the first imaging device are from the same manufacturer but of different models and/or different modalities (e.g., the second imaging device is for CT imaging, while the first imaging device is for MRI imaging), then the images generated by the second imaging device and the images generated by the first imaging device may be of different styles. In some embodiments, the target transformation model may use an image of an original style as input (also referred to as an input image), process the image, and output a transferred image (also referred to as an output image) of a target style. The original style of the input image and the target style of the output image may be different. For example, the original style of the input image may be the same as or similar to that of images generated by the first imaging device, while the target style of the output image may be the same as or similar to that of images generated by the second imaging device.

In some embodiments, the target transformation model may be an artificial intelligent model. In some embodiments, the target transformation model may be an unsupervised learning model. In some embodiments, the target transformation model may be a supervised learning model. In some embodiments, the target transformation model may be a reinforcement learning model. Exemplary target transformation models for image style transfer may include an anticipatory learning model, an unpaired image-to-image translation model, or any other model for image style transfer. Exemplary anticipatory learning models may include a generative adversarial network (GAN), a conditional generative adversarial network (cGAN), a cycle-consistent adversarial network (cycle-GAN), a coupled generative adversarial network (coGAN), or the like, or any combinations thereof. Exemplary unpaired image-to-image translation models may include a Bayesian framework, a cross-modal scene network, GAN combined with a variational autoencoder (VAE), or the like, or any combinations thereof. Other models for image style transfer may include a non-parametric texture model, a "pix2pix" framework, a convolutional neural network (CNN), or the like, or any combinations thereof. In some embodiments, one user (e.g., each) may have one or more customized target transformation models. In some embodiments, one scan region (e.g., each) may have one or more corresponding target transformation models. In some embodiments, one target style (e.g., each target style) may have one or more corresponding target transformation models. In some embodiments, a specific amount or extent of image style transformation from the first style to the target style may correspond to one or more target transformation models. For example, for a same scan region (e.g., a head), a first user may correspond to a first customized target transformation model, while a second user may correspond to a second customized target transformation model. As another example, the first user may correspond to a third customized target transformation model for a first scan region (e.g., an esophagus), and a fourth customized target transformation model for a second scan region (e.g., a stomach). As a further example, for the same scan region, and the same user, a fifth target transformation model may be used for image style transfer to a first target style (e.g., associated with a third imaging device), while a sixth target transformation model may be used for image style transfer to a second target style (e.g., associated with a fourth imaging device).

In some embodiments, the target transformation model may be a transformation model that is already trained offline. In some embodiments, one or more transformation models that have been trained may be stored in one or more storage devices (e.g., the storage device 150, the storage 220, and/or the storage 390) of the imaging system 100 and/or an external data source. In some embodiments, information of the second imaging device may be obtained (e.g., via the user interface). In some embodiments, the target transformation model corresponding to the target style may be selected from two or more trained transformation models (e.g., based on the information of the second imaging device). In some embodiments, the target transformation model may be automatically identified based on information relating to the original image, and/or information relating to the user.

Exemplary information relating to the original image may include a scan region of the object in the original image, a modality (e.g., CT, MRI, PET, etc.) of the original image, the model identification number of the first imaging device that generates the original image, or the like. In some embodiment, at least a portion of the information relating to the original image (e.g., the scan region of the original image) may be included in a scanning protocol of the original image, and thus the processing device 140a may automatically analyze the scanning protocol and obtain corresponding information. In some embodiments, the processing device 140a may identify, according to the scanning protocol of the original image, from two or more trained transformation models, the target transformation model corresponding to a scan region of the scanning protocol. In some embodiments, the processing device 140a may automatically detect or recognize at least a portion of the information relating to the original image (e.g., the scan region of the original image) using one or more image recognition technologies (e.g., segmentation algorithms, template matching algorithms, or the like). For example, the processing device 140a may segment the original image and recognize the scan region. In some embodiments, the processing device 140a may identify, according to the scan region, from two or more trained transformation models, the target transformation model corresponding to the scan region.

Exemplary information relating to the user may include a user identification (or a user account) of the user, a login status of the user, the target style (or information of the second imaging device) identified or preferred by the user, or the like. Information of the second imaging device may include a model identification number of the second imaging device, a manufacturer of the second imaging device, a modality of the second imaging device, or the like, or a combination thereof. In some embodiments, at least a portion of the information relating to the user (e.g., the user identification (or user account)) may be recorded in one or more storage devices associated with the imaging system, and the processing device 140a may obtain the information from the storage devices. In some embodiments, at least a portion of the information relating to the user (e.g., the model identification number of the second imaging device) may be inputted by the user via the user interface, and the processing device 140a may obtain the information via the user interface. In some embodiments, because different users, different scan regions, and/or different target styles may correspond to different target transformation models, the processing device 140a may directly identify the target transformation model by matching the information relating to the user, the scan region of the original image, and/or the target style with the one or more trained transformation models. For example, the processing device 140a may identify, according to the login information of the user, from two or more trained transformation models, a trained transformation model corresponding to the user as the target transformation model. The target transformation model corresponding to the user may be identified based on a prior user selection of the target transformation model, prior use of the target transformation model by the user, etc.

In some embodiments, the target transformation model may be determined based on a second instruction of the user. The second instruction may be associated with one or more trained transformation models provided or selected by the user via the user interface. In some embodiments, the user may provide or select the target transformation model via the user interface. For example, the user interface may present a button, if the user clicks the button by pressing it on a touchscreen or using a mouse, the user interface may present one or more file storage paths to the user, and the user can select a file storage path storing the target transformation model (or further select the target transformation model from a plurality of trained transformation models stored in the file storage path), and the processing device 140a may obtain the target transformation model from the selected file storage path. As another example, the user may provide the target transformation model by operably connecting a storage device that stores the target transformation model with the computing device 200, then the user interface may present the content stored in the storage device to the user, and/or the user may select or identify the target transformation model via the user interface.

In some embodiments, the target transformation model may be determined by training a transformation model. In some embodiments, the processing device 140a may train the transformation model to obtain the target transformation model. In some embodiments, the processing device 140b or an external processing device outside the imaging system 100 may train the transformation model to obtain the target transformation model, and the processing device 140a may acquire the target transformation model from the processing device 140b or the external processing device outside the imaging system 100, e.g., via the network 120.

In some embodiments, the training and/or updating of the transformation model may be performed offline. In some embodiments, a pre-trained transformation model may be obtained, and then the target transformation model may be determined by training the pre-trained transformation model with one or more reference images. In some embodiments, the pre-trained transformation model may be generated by the manufacturer of the first imaging device and/or stored in one or more storage devices (e.g., the storage device associated with the first imaging device). More descriptions of the reference images and the determination of the target transformation model may be found elsewhere in the present disclosure (e.g., FIG. 6 and descriptions thereof). More descriptions of the pre-trained transformation model may be found elsewhere in the present disclosure (e.g., FIGS. 6 and 7 and descriptions thereof). Alternatively, in some embodiments, the target transformation model may be determined by training an initial transformation model. The initial transformation model may refer to a transformation model (with initial parameters) that needs to be trained. More descriptions of the initial transformation model and the determination of the target transformation model may be found elsewhere in the present disclosure (e.g., FIG. 8 and descriptions thereof).

In 506, a transferred image may be generated by transferring a first style (also referred to as an original style) of the original image using the target transformation model. In some embodiments, the processing device 140a (e.g., the generation module 406) may perform operation 506. The first style of the original image may refer to a style of the original image before being transferred. The transferred image may be of a second style. The second style may be substantially the same as or similar to the target style. The target style may be associated with one or more other images generated by the second imaging device. The second imaging device may be a device that the user has used and/or is accustomed to. The second imaging device may have a model identification number. The model identification number may correspond to or be associated with a plurality of imaging devices that are of a same or similar model (or type) as the second imaging device. Similar to the model identification number of the first imaging device, the model identification number of the second imaging device may be set by a manufacturer of the second imaging device based on a second predetermined rule. In some embodiments, the second predetermined rule may be the same as or similar to the first predetermined rule. In some embodiments, the second predetermined rule may be different from the first predetermined rule. In some embodiments, the first imaging device and the second imaging device may be produced by different manufacturers. In some embodiments, the first imaging device and the second imaging device may be produced in different batches by a same manufacturer. In some embodiments, the first imaging device and the second imaging device may be of a same modality (e.g., CT, MRI, PET, etc.). In some embodiments, the first imaging device and the second imaging device may be of different modalities.

In some embodiments, the transferred image may be generated based on the target transformation model and a third instruction of the user, or the transferred image generated based on the target transformation model may be modified or adjusted based on the third instruction of the user. The third instruction may be associated with a customization of the generation of the transferred image, e.g., an amount or extent of image style transformation from the first style to the target style. In some embodiments, the user may interact with the user interface, and the processing device 140a may obtain the third instruction of the user via the user interface. For example, the user interface may present a trackbar for user operation. The trackbar may be configured to indicate a similarity between a second style of the transferred image and the target style. One end of the trackbar may represent that the second style of the transferred image is the same as or approximate to the target style, while the other end of the trackbar may represent that the second style of the transferred image maintains as the first style (i.e., the original image is untransformed). In some embodiments, the user may specify (e.g., by dragging the trackbar to adjust) the amount or extent of image style transformation from the first style to the target style. It should be noted that in some embodiments, information relating to the customization of the generation of the transferred image may be used as a basis for the determination of the target transformation model in 504, and the transferred image generated in 506 may directly have a customized effect. For example, in 504, the user may drag the trackbar to adjust the amount or extent of image style transformation from the first style toward the target style, and an available target transformation model that can realize the customized effect may be determined based on the amount or extent of image style transformation. The style of the transferred image (or referred to as a second style) may be the same as or similar to the target style. As another example, in 504, the user may specify (e.g., by dragging the trackbar to adjust) the amount or extent of image style transformation from the first style to the target style, and the amount or extent of image style transformation may be used as an input for training the target transformation model.

In 508, the transferred image may be provided to a user for presentation. In some embodiments, the processing device 140a (e.g., the transmission module 408) may perform operation 508. In some embodiments, the transferred image may be provided to the user for presentation via the user interface. For instance, the transferred image may be provided to the user (e.g., via the network 120) and displayed on a terminal 130. In some embodiments, the user may assess the transferred image. If the transferred image does not meet the need of the user, the user may use another target transformation model and process the original image again, i.e., the operations 504-508 may be repeated. Alternatively, the user may offer a feedback to the processing device 140a on the basis of which the processing device 140a can automatically process the original image using another target transformation model. In some embodiments, the transferred image may be stored in one or more storage devices (e.g., the storage device 150, the storage 220, and/or the storage 390) of the imaging system 100 and/or an external data source for further use of the user.

It should be noted that the above description of the process 500 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, operations 502 and 504 may be integrated into a single operation. As another example, operation 504 may be performed before or simultaneously with the operation 502. As a further example, operation 508 may be omitted. In some embodiments, the methods may be provided as an add-on to any new imaging device, providing imaging device manufacturer(s) and/or users the flexibility to conveniently adopt the methods as described herein without significant changes to the design or configurations of the new imaging device.

Figure 6:
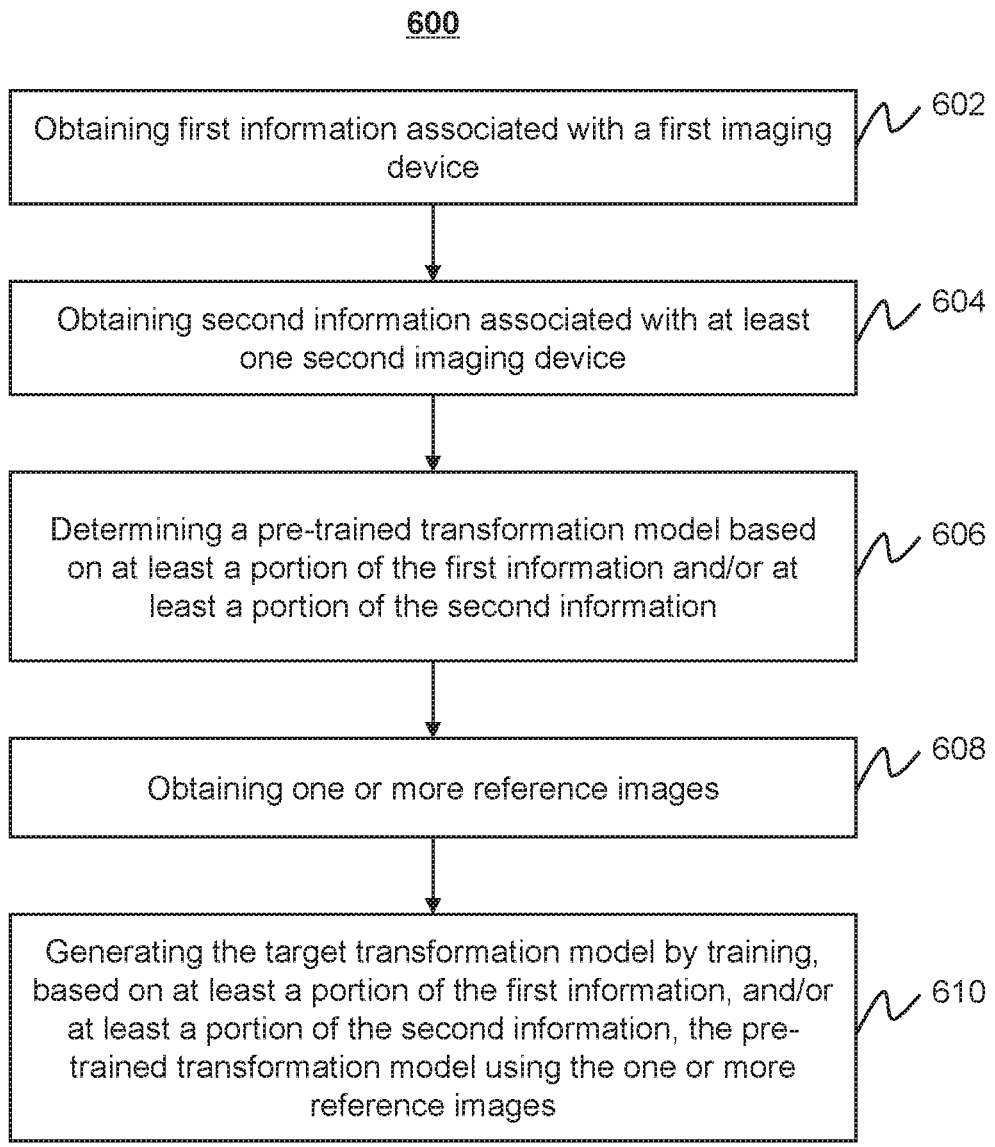
FIG. 6 is a flowchart illustrating an exemplary process for determining a target transformation model by training a pre-trained transformation model according to some embodiments of the present disclosure.

FIG. 6 is a flowchart illustrating an exemplary process for determining a target transformation model by training a pre-trained transformation model according to some embodiments of the present disclosure. In some embodiments, the process 600 may be executed by the imaging system 100. For example, the process 600 may be implemented as a set of instructions (e.g., an application) stored in one or more storage devices (e.g., the storage device 150, the storage 220, and/or the storage 390) and invoked and/or executed by the processing device 140b (implemented on, for example, the processor 210 of the computing device 200, and the CPU 340 of the mobile device 300). The operations of the process 600 presented below are intended to be illustrative. In some embodiments, the process may be accomplished with one or more additional operations not described, and/or without one or more of the operations discussed. Additionally, the order in which the operations of the process 600 as illustrated in FIG. 6 and described below is not intended to be limiting. In some embodiments, operation 504 illustrated in FIG. 5 may be performed according to the process 600. In some embodiments, the target transformation model determined in 504 may be generated according to the process 600. In some embodiments, one or more operations in process 600 (e.g., operations 608 and/or 610) may be performed by the processing device 140a. In some embodiments, one or more operations in process 600 (e.g., operations 602-606) may be performed by the processing device 140b or an external processing device outside the imaging system 100. For example, one or more operations in process 600 may be performed by a processing device (outside the imaging system 100) of a manufacturer of the first imaging device. In the following descriptions, one or more operations of process 600 performed by the processing device 140b are merely provided for the purposes of illustration, and not intended to limit the scope of the present disclosure.

In 602, first information associated with a first imaging device (e.g., the first imaging device that generates the original image) may be obtained. In some embodiments, the processing device 140a (e.g., the obtaining module 402) or the processing device 140b (e.g., the obtaining module 412) may perform operation 602. The first information may include information relating to the first imaging device, information relating to a user (e.g., a doctor, a radiologist, an operator of an imaging device, an expert of an imaging device, or the like) that uses or needs to use the first imaging device and/or reviews images generated by the first imaging device, and/or one or more settings relating to an image style associated with the first imaging device provided by, e.g., the user. The information relating to the first imaging device may include the model identification number, the modality, the manufacturer, the manufacturing date, the batch information, a serial number, functionalities, operation parameters of the first imaging device, or the like, or a combination thereof. The information relating to the user may include basic information of the user (e.g., identification information, user name, age, gender, work experience, the user's specialty, the scan region that the user usually detects), whether the user has used the first imaging device, whether the user has used an imaging device of the same model as the first imaging device, whether the user has used an imaging device of a different model from but made by the same manufacturer as the first imaging device, information of the imaging device(s) that the user has used, or the like. In some embodiments, the one or more settings may include an amount or extent of image style transformation from a first style associated with the first imaging device to a target style associated with a second imaging device or to the second style, one or more scan regions of one or more objects, or the like, or a combination thereof.

In some embodiments, at least a portion of the first information may be provided by a user via a user interface.

In some embodiments, the processing device 140a or 140b may provide a first setup wizard, a first questionnaire, or the like, via the user interface. The first setup wizard may be used to guide the user to offer at least a portion of the first information. The first setup wizard may include one or more questions and/or one or more options regarding the first information, and the user may input or select corresponding information through an I/O device (e.g., the I/O 230). In some embodiments, the first setup wizard may present the question(s) and/or option(s) for the user in a plurality of display pages (e.g., when the first imaging device is installed or tuned up (calibrated), or when an image processing application is installed in the first imaging device). A display page may include at least one question and/or at least one option. In some embodiments, the first questionnaire may include one or more questions and/or one or more options about at least a portion of the first information for user selection or prompting/facilitating the user to input desired information. The first questionnaire may be recorded in a document. The user may fill in the first questionnaire through the I/O device.

In some embodiments, the user interface may present a trackbar for user operation. The trackbar may be configured to indicate the amount or extent of image style transformation from the first style to the target style. A desired amount or extent of image style transformation may be specified by operating the trackbar (e.g., sliding the trackbar between different positions each of which corresponds to an amount or extent of image style transformation). One end of the trackbar may represent a maximum extent of image style transformation from the first style to the target style, while the other end of the trackbar may represent a minimum extent of image style transformation from the first style to the target style. In some embodiments, the amount or extent of image style transformation from the first style to the target style may be expressed by a percentage. The maximum extent of image style transformation from the first style to the target style may be 100% or a value between 0% and 100%. If the maximum extent of image style transformation from the first style to the target style is 100%, a transferred image (or the image style after transformation) by the maximum extent of image style transformation from the first style may be of the target style. The minimum extent of image style transformation from the first style to the target style may be 0%, or a value between 0% and 100%. If the minimum extent of image style transformation from the first style to the target style is 0%, a transferred image (or the image style after transformation) by the minimum extent of image style transformation from the first style may remain of the first style.

In some embodiments, the first information of the first imaging device may be obtained when the first imaging device is installed or tuned up (calibrated), an image processing application is installed in the first imaging device, a new user is registered, the original image needs to be transferred, or when a new target transformation model is needed, or under one or more other situations in which at least a portion of the first information needs to be updated.

In 604, second information associated with at least one second imaging device of a second model may be obtained. In some embodiments, the processing device 140a (e.g., the obtaining module 402) or the processing device 140b (e.g., the obtaining module 412) may perform operation 604. In some embodiments, the at least one second imaging device may generate images to which the user is accustomed. The at least one second imaging device may be associated with one or more target styles (i.e., the images generated by the at least one second imaging devices may have one or more target styles). The second information may include information relating to the at least one second imaging device, and/or information relating to the user that used the at least one second imaging device. The information relating to the at least one second imaging device may include the model identification number, the modality, the manufacturer, the manufacturing date, the batch information, a serial number, functionalities, of the at least one second imaging device, or the like, or a combination thereof. In some embodiments, the information relating to the user that used the at least one second imaging device may include a time length that the user has been using each of the at least one second imaging device, a ranking of the at least one second imaging device based on a preference of the user, one or more operation parameters of the at least one second imaging device, one or more preference settings of the at least one second imaging device, or the like. In some embodiments, the first imaging device and the at least one second imaging device may be produced by different manufacturers. In some embodiments, the first imaging device and the at least one second imaging device may be produced in different batches by a same manufacturer. More descriptions of the first imaging device and the second imaging device(s) may be found elsewhere in the present disclosure (e.g., FIG. 5 and descriptions thereof).

In some embodiments, at least a portion of the second information may be provided by a user via a user interface. In some embodiments, the processing device 140a or 140b may provide a second setup wizard, a second questionnaire, or the like, via the user interface. The second setup wizard may be used to guide the user to offer at least a portion of the second information. The second setup wizard may include one or more questions and/or one or more options regarding the second information, and the user may input or select corresponding information through an I/O device (e.g., the I/O 230). In some embodiments, the second setup wizard may present the question(s) and/or option(s) for the user in a plurality of display pages (e.g., when the first imaging device is installed or tuned up (calibrated), or when an image processing application is installed in the first imaging device). A display page may include at least one question and/or at least one option. In some embodiments, the second questionnaire may include one or more questions and/or one or more options about at least a portion of the second information for user selection or prompting/facilitating the user to input desired information. The second questionnaire may be recorded in a document. The user may fill in the second questionnaire through the I/O device.

In some embodiments, the second information of the second imaging device may be obtained when the first imaging device is installed or tuned up (calibrated), an image processing application is installed in the first imaging device, a new user is registered, the original image needs to be transferred, or when a new target transformation model is needed, or under one or more other situations in which at least a portion of the second information needs to be updated. It should be noted that in some embodiments, operations 602 and 604 may be integrated into a single operation, and the first information and the the second information may be obtained via the user interface simultaneously in one information acquisition operation. For example, the first information and the the second information may be obtained through a single setup wizard or questionnaire. That is, the first setup wizard and the second setup wizard may be different portions of a single setup wizard, or the first questionnaire and the second questionnaire may be different portions of a single questionnaire.

In 606, a pre-trained transformation model may be determined based on at least a portion of the first information, and/or at least a portion of the second information. In some embodiments, the processing device 140a (e.g., the determination module 404) or processing device 140b (e.g., the determination module 414) may perform operation 606. A pre-trained transformation model may refer to a noncustomized transformation model trained using a plurality of training images generated by the first imaging device (or one or more imaging devices having a same model identification number as the first imaging device) and the second imaging device (or one or more imaging devices having a same model identification number as the second imaging device). As used herein, "noncustomized" indicates that the transformation model is not trained based on user specified information (e.g., images provided by the user). In some embodiments, the pre-trained transformation model may have one or more parameters that are at least partially optimized in one or more training processes. In some embodiments, exemplary pre-trained transformation models for image style transfer may include an anticipatory learning model, an unpaired image-to-image translation model, or any other model for image style transfer. More descriptions of the transformation model may be found elsewhere in the present disclosure (e.g., FIG. 5 and descriptions thereof). In some embodiments, the target transformation model determined in 504 may have a same or similar model structure with the pre-trained transformation model determined in 606.

In some embodiments, one or more pre-trained transformation models may be stored in one or more storage devices (e.g., the storage device 150, the storage 220, and/or the storage 390) associated with the imaging system 100 and/or an external data source accessible by the imaging system 100 via, e.g., the network 120. In some embodiments, one user (e.g., each) may correspond to one or more pre-trained transformation models. In some embodiments, one scan region (e.g., each) may correspond to one or more corresponding pre-trained transformation models. In some embodiments, one target style (e.g., each target style) may correspond to one or more corresponding pre-trained transformation models. In some embodiments, a specific amount or extent of image style transformation from the first style to the target style may correspond to one or more pre-trained transformation models. In some embodiments, the pre-trained transformation model may be a versatile transformation mode that is applicable to a plurality of users, a plurality of scan regions, and/or a plurality of image styles. In some embodiments, one or more pre-trained transformation models that have been trained may be stored in one or more storage devices (e.g., the storage device 150, the storage 220, and/or the storage 390) of the imaging system 100 and/or an external data source. In some embodiments, a pre-trained transformation model may be identified from the one or more candidate pre-trained transformation models. In some embodiments, the pre-trained transformation model may be automatically identified based on at least a portion of the first information, and/or at least a portion of the second information. In some embodiments, the pre-trained transformation model may be determined based on a fourth instruction of the user. The fourth instruction may be associated with one or more pre-trained transformation models provided or selected by the user via the user interface. In some embodiments, the pre-trained transformation model may be generated by training an initial transformation model based on images from the first imaging device and the second imaging device. More descriptions of the generation of the pre-trained transformation model may be found elsewhere in the present disclosure (e.g., FIG. 7 and descriptions thereof).

In 608, one or more reference images may be obtained. In some embodiments, the processing device 140a (e.g., the obtaining module 402) or the processing device 140b (e.g., the obtaining module 412) may perform operation 608. A reference image may be an image (regarding a specific scan region) of the user's preferred style or an image (regarding a specific scan region) of a target style that the user is accustomed to. The specific scan region may be a scan region that the user is interested in. For example, if the user is a doctor of a respiratory department, the specific scan region may be the chest or a portion thereof of a patient. In some embodiments, the reference image(s) may be generated by the at least one second imaging device. In some embodiments, the reference image(s) may be obtained from one or more storage devices (e.g., the storage device 150, the storage 220, and/or the storage 390) associated with the imaging system 100 and/or an external data source. In some embodiments, the reference image(s) may be automatically obtained when the process 600 is implemented. For example, the reference images may be stored in a default folder on a storage device, and the processing device 140a or 140b may automatically obtain the reference images from the default folder. As another example, the imaging system 100 may remember what images the user have reviewed or is accustomed to, and automatically obtain the images as the reference images. In some embodiments, the reference image(s) may be provided or selected by the user via a user interface. For example, the user interface may present a button, if the user clicks the button by pressing it on a touchscreen or using a mouse, the user interface may present one or more file storage paths to the user, and the user can select a file storage path where the reference images are stored (or further select the reference images from a plurality of images stored in the file storage path), and the processing device 140a or 140b may obtain the reference images from the selected file storage path. As another example, the user may provide the reference images by operably connecting a storage device that stores the reference images with the computing device 200, then the user interface may present the content stored in the storage device to the user, and/or the user may select or identify the reference images via the user interface.

In 610, the target transformation model may be generated by training, based on at least a portion of the first information and/or at least a portion of the second information, the pre-trained transformation model using the one or more reference images. In some embodiments, the processing device 140a (e.g., the generation module 406) or the processing device 140b (e.g., the training module 416) may perform operation 610. In some embodiments, in the training process of the target transformation model, the one or more reference images, at least a portion of the first information (e.g., the model identification number of the first imaging device, identification information of the user, etc.), and/or at least a portion of the second information (e.g., the model identification number of the second imaging device) may be input into the pre-trained transformation model, and one or more processed images (e.g., processed images generated based on (random) original images, processed images generated based on images from the first imaging device) may be generated as output of the pre-trained transformation model. In some embodiments, values of one or more loss functions may be determined by the processing device 140a or 140b based on the output of the pre-trained transformation model and the reference images. The loss function(s) may relate to a degree of similarity between the style of the processed images and the style of the reference images. The value(s) of the loss function(s) may be compared with one or more thresholds. The training may terminate when the value(s) of the loss function(s) are less than the threshold(s), and the target transformation model may be determined. In some embodiments, the target transformation model may be determined offline and stored in one or more storage devices (e.g., the storage device 150, the storage 220, and/or the storage 390) and/or an external data source for future use. In some embodiments, the target transformation model may be determined online and used in an online style transformation operation. If the value(s) of the loss function(s) are larger than the threshold(s), the training process may continue such that one or more parameters of the pre-trained transformation model may be further adjusted in a next iteration until the value(s) of the loss function(s) fall below the threshold(s). The threshold(s) may be determined by the imaging system 100, or may be preset by a user or operator via the terminal(s) 130. More descriptions of the training process of exemplary target transformation models may be found elsewhere in the present disclosure (e.g., FIGS. 9-11 and descriptions thereof).

It should be noted that the above description of the process 600 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, operations 602 and 604 may be integrated into a single operation. As another example, operation 608 may be performed before or simultaneously with one or more of the operations 602-606. In some embodiments, the target transformation model may be updated, e.g., after a periodic time (such as a week, a month, a quarter, a year, or the like). In some embodiments, the methods may be provided as an add-on to any new imaging device, providing imaging device manufacturer(s) and/or users the flexibility to conveniently adopt the methods as described herein without significant changes to the design or configurations of the new imaging device.

Figure 7:
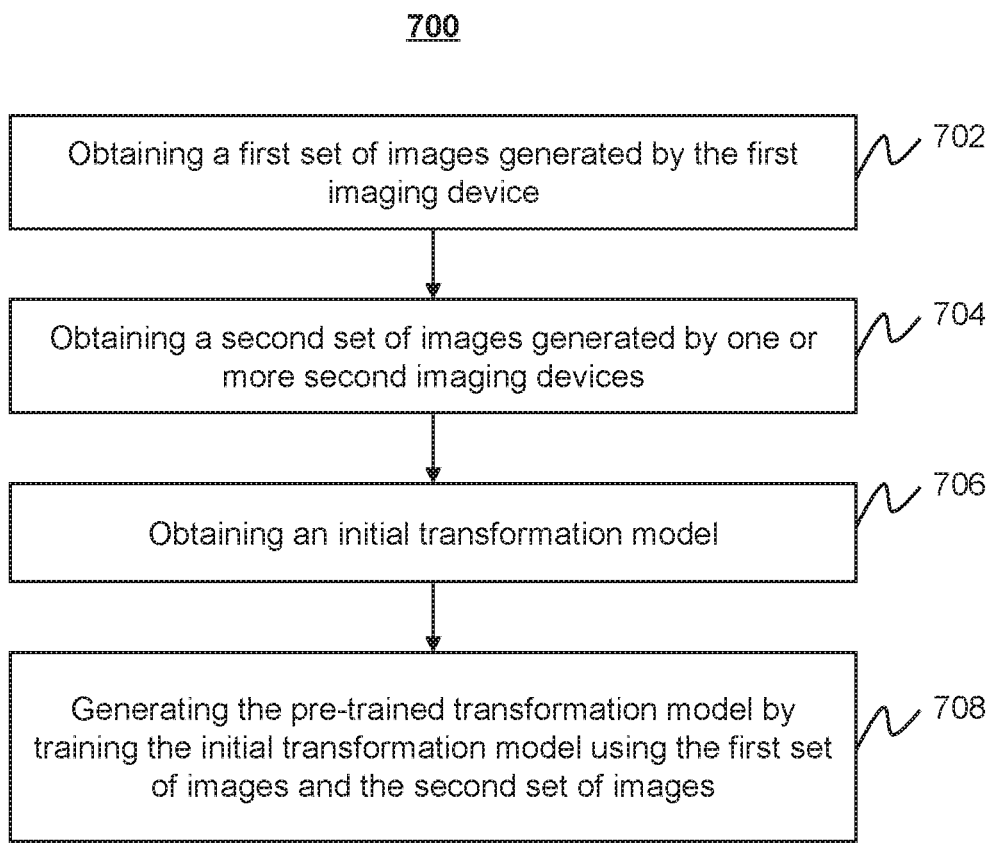
FIG. 7 is a flowchart illustrating an exemplary process for generating a pre-trained transformation model according to some embodiments of the present disclosure.

FIG. 7 is a flowchart illustrating an exemplary process for generating a pre-trained transformation model according to some embodiments of the present disclosure. In some embodiments, the process 700 may be executed by the imaging system 100. For example, the process 700 may be implemented as a set of instructions (e.g., an application) stored in one or more storage devices (e.g., the storage device 150, the storage 220, and/or the storage 390) and invoked and/or executed by the processing device 140b (implemented on, for example, the processor 210 of the computing device 200, and the CPU 340 of the mobile device 300). The operations of the process 700 presented below are intended to be illustrative. In some embodiments, the process may be accomplished with one or more additional operations not described, and/or without one or more of the operations discussed. Additionally, the order in which the operations of the process 700 as illustrated in FIG. 7 and described below is not intended to be limiting. In some embodiments, operation 606 illustrated in FIG. 6 may be performed according to the process 700. In some embodiments, the pre-trained transformation model determined in 606 may be generated according to the process 700. In some embodiments, one or more operations in process 700 may be performed by the processing device 140a. In some embodiments, one or more operations in process 700 may be performed by the processing device 140b or an external processing device outside the imaging system 100. For example, one or more operations in process 700 may be performed by a processing device of a manufacturer of the first imaging device outside the imaging system 100. In the following descriptions, one or more operations of process 700 performed by the processing device 140b are merely provided for the purposes of illustration, and not intended to limit the scope of the present disclosure.

It should be noted that in some embodiments, operation 504 may be performed according the process 600 in FIG. 6 and/or process 700 in FIG. 7. For example, the pre-trained transformation model may be trained offline, and the target transformation model may be trained online based on the pre-trained transformation model. Alternatively, operation 504 may be performed according to process 800 in FIG. 8. For example, the target transformation model may be trained online based on an initial transformation model online.

In 702, a first set of images generated by the first imaging device may be obtained. In some embodiments, the processing device 140b (e.g., the obtaining module 412) may perform operation 702. In some embodiments, the first set of images may include medical images. In some embodiments, the medical images may include information relating to one or more scan regions, such as a breast, the esophagus, a trachea, a bronchus, the stomach, or the like. In some embodiments, the first set of images may include images of one or more objects, such as one or more children, one or more teenagers, one or more middle-aged people, one or more old people. In some embodiments, the first set of images may be obtained from one or more storage devices (e.g., the storage device 150, the storage 220, and/or the storage 390) of the imaging system 100 and/or an external data source via, e.g., the network 120. Exemplary external data sources may include an OsiriX database, a Cancer Imaging Archive database, a beamandrew medical database, database of International Symposium on Biomedical Imaging (ISBI), or the like, or a combination thereof. In some embodiments, the first set of images may be automatically obtained by the processing device 140b, or provided or selected by a user (e.g., an engineer of the manufacturer of the first imaging device, a doctor, a radiologist, an operator of the first imaging device, an expert of the first imaging device, or the like).

In 704, a second set of images generated by one or more of the at least one second imaging device may be obtained. In some embodiments, the processing device 140b (e.g., the obtaining module 412) may perform operation 704. In some embodiments, the second set of images may include medical images. In some embodiments, the second set of images may include images of one or more objects, such as one or more children, one or more teenagers, one or more middle-aged people, one or more old people. In some embodiments, the second set of images may be obtained from one or more storage devices (e.g., the storage device 150, the storage 220, and/or the storage 390) of the imaging system 100 and/or an external data source via, e.g., the network 120. Exemplary external data sources may be similar to those described with respect to 702. In some embodiments, the second set of images may be automatically obtained by the processing device 140b, or provided or selected by a user (e.g., an engineer of the manufacturer of the first imaging device, an engineer of the manufacturer of the second imaging device, a doctor, a radiologist, an operator of the first or second imaging device, an expert of the first or second imaging device, or the like. The scan region(s) represented in the first set of images and the scan region(s) represented in the second set of images may be the same, partially overlapping (at least one scan region represented in the first set of images also being represented in the second set of images), or totally different (in that the scan region(s) represented in the first set of images not overlapping the scan region(s) represented in the second set of images). The object(s) (e.g., patients) represented in the first set of images and the object(s) represented in the second set of images may be the same, partially overlapping (at least one object represented in at least one of the first set of images also being represented in at least one of the second set of images), or totally different (no object represented in the first set of images being represented in the second set of images).

In 706, an initial transformation model may be obtained. In some embodiments, the processing device 140*b* (e.g., the obtaining module 412) may perform operation 706. The initial transformation model may be an untrained transformation model. In some embodiments, the processing device 140*b* may perform a plurality of iterations to iteratively update one or more parameter values of the initial transformation model. Before the plurality of iterations, the processing device 140*b* may initialize the parameter values of the initial transformation model. Exemplary parameters of the initial transformation model may include the size of a kernel of a layer, the total count (or number) of layers, the count (or number) of nodes in each layer, a learning rate, a batch size, an epoch, a connected weight between two connected nodes, a bias vector relating to a node, etc. In some embodiments, the one or more parameters may be set randomly. In some embodiments, the one or more parameters may be set to one or more certain values, e.g., 0, 1, or the like. For example, the connected weights and/or the bias vector of nodes of the initial transformation model may be initialized by assigning random values in a range, e.g., the range from −1 to 1. As another example, all the connected weights of the initial transformation model may be assigned a same value in the range from −1 to 1, for example, 0. As still an example, the bias vector of nodes in the initial transformation model may be initialized by assigning random values in a range from 0 to 1. In some embodiments, the parameter values of the initial transformation model may be initialized based on a Gaussian random algorithm, a Xavier algorithm, etc.

In some embodiments, exemplary initial transformation models may include an anticipatory learning model, an unpaired image-to-image translation model, or any other model for image style transfer. More descriptions of the initial transformation model may be found elsewhere in the present disclosure (e.g., FIG. 5 and descriptions thereof). In some embodiments, the initial transformation model may be stored in one or more storage devices (e.g., the storage device 150, the storage 220, and/or the storage 390) associated with the imaging system 100 and/or an external data source. In some embodiments, the initial transformation model may be automatically obtained from the storage device(s). In some embodiments, the initial transformation model may be determined based on a fifth instruction of the user. The fifth instruction may be associated with an initial transformation model provided or selected by the user via the user interface.

In 708, the pre-trained transformation model may be generated by training the initial transformation model using the first set of images and the second set of images. In some embodiments, the processing device 140*b* (e.g., the training module 416) may perform operation 708. In some embodiments, in the training process, the first set of images and the second set of images may be input into the initial transformation model, and output of the initial transformation model may include one or more processed images (e.g., processed images generated based on the first set of images). In some embodiments, values of one or more loss functions may be determined by the processing device 140*b* based on the output of the initial transformation model and the second set of images. The loss function(s) may relate to a degree of similarity between the style of the processed images and the style of the second set of images. The value(s) of the loss function(s) may be compared with one or more thresholds. If the value(s) of the loss function(s) are less than the threshold(s), the training may terminate and the pre-trained transformation model may be determined. In some embodiments, the pre-trained transformation model may be stored in one or more storage devices (e.g., the storage device 150, the storage 220, and/or the storage 390) and/or an external data source accessible by the imaging system 100 via, e.g., the network 120. If the value(s) of the loss function(s) are larger than the threshold(s), the training process may continue such that one or more parameters of the initial transformation model may be further adjusted in a next iteration until the value(s) of the loss function(s) fall below the threshold(s). The threshold(s) may be determined by the imaging system 100, or may be preset by a user or operator via the terminal(s) 130. More descriptions of the loss function and the training process of the pre-trained transformation model may be found elsewhere in the present disclosure (e.g., FIGS. 9-11 and descriptions thereof).

In some embodiments, after training, the pre-trained transformation model may be stored in one or more storage devices (e.g., the storage device 150, the storage 220, and/or the storage 390) associated with the imaging system 100 and/or an external data source (e.g., a database associated with or specified by the manufacturer of the first imaging device). In some embodiments, the pre-trained transformation model may be updated automatically after a periodic time (such as a week, a month, a quarter, a year, or the like). In some embodiments, the updating of the pre-trained transformation model may be triggered by a user. For example, the user interface may present a button, if the user clicks the button by pressing it on a touchscreen or using a mouse, the processing device 140*b* may be directed to update the pre-trained transformation model. In some embodiments, the pre-trained transformation model may be updated by an iterative process based on one or more training image(s). In some embodiments, the training image(s) may include images newly generated from the first imaging device and/or the second imaging device. In some embodiments, the training image(s) may include a scan region that is not represented in the first set of images and/or the second set of image(s). The training image(s) may be provided by the user or obtained from a prescribed file storage path. The updated pre-trained transformation model may be stored in one or more storage devices (e.g., the storage device 150, the storage 220, and/or the storage 390) associated with the imaging system 100 and/or an external data source (e.g., a database associated with or specified by the manufacturer of the first imaging device) accessible by the imaging system 100 via, e.g., the network 120.

It should be noted that the above description of the process 700 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, operations 702 and 704 may be integrated into a single operation. As another example, operation 706 may be performed before or simultaneously with the one or more of operations 702 and 704. In some embodiments, the methods may be provided as an add-on to any new imaging device, providing imaging device manufacturer(s) and/or users the flexibility to conveniently adopt the methods as described herein without significant changes to the design or configurations of the new imaging device.

Figure 8:
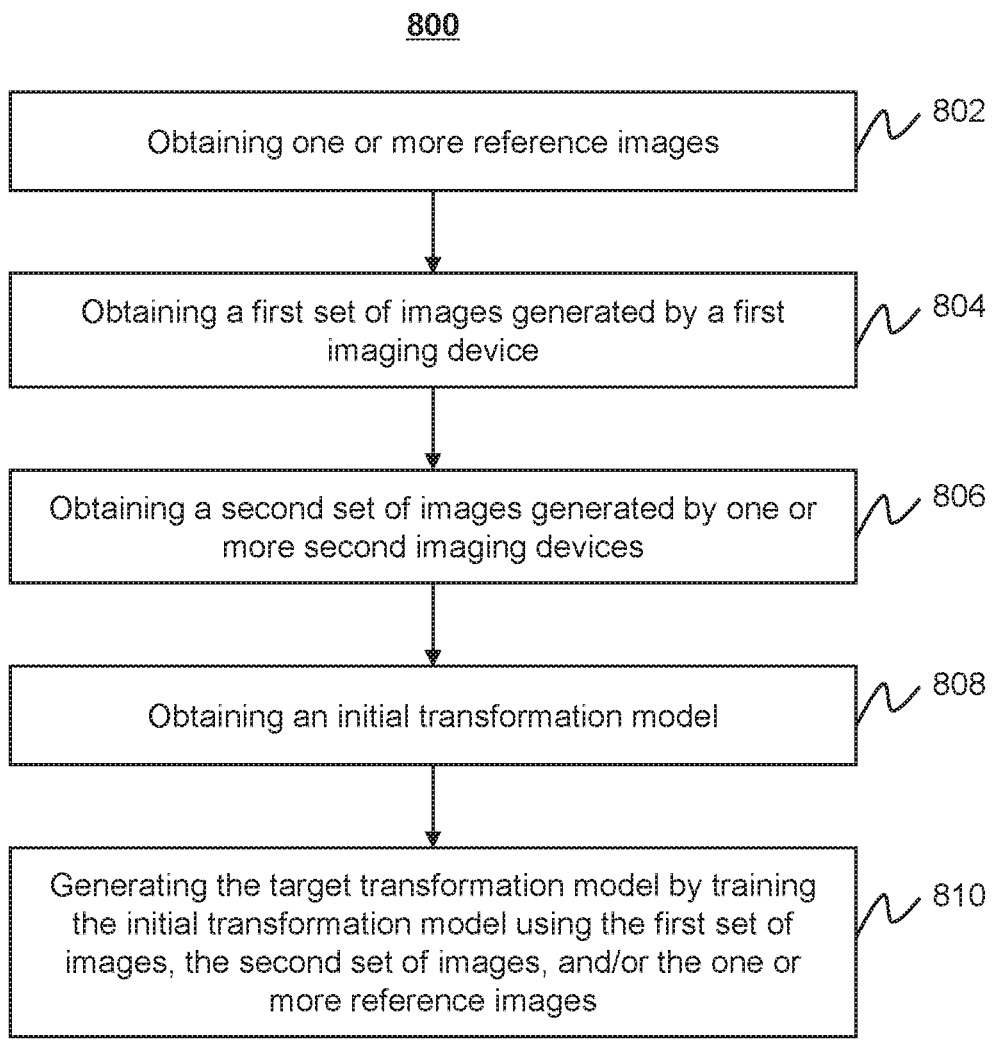
FIG. 8 is a flowchart illustrating an exemplary process for determining a target transformation model by training an initial transformation model according to some embodiments of the present disclosure.

FIG. 8 is a flowchart illustrating an exemplary process for determining a target transformation model by training an initial transformation model according to some embodiments of the present disclosure. In some embodiments, the process 800 may be executed by the imaging system 100. For example, the process 800 may be implemented as a set of instructions (e.g., an application) stored in one or more storage devices (e.g., the storage device 150, the storage 220, and/or the storage 390) and invoked and/or executed by the processing device 140b (implemented on, for example, the processor 210 of the computing device 200, and the CPU 340 of the mobile device 300). The operations of the process 800 presented below are intended to be illustrative. In some embodiments, the process may be accomplished with one or more additional operations not described, and/or without one or more of the operations discussed. Additionally, the order in which the operations of the process 800 as illustrated in FIG. 8 and described below is not intended to be limiting. In some embodiments, operation 504 illustrated in FIG. 5 may be performed according to the process 800. In some embodiments, the target transformation model determined in 504 may be generated according to the process 800. In some embodiments, one or more operations in process 800 may be performed by the processing device 140a. In some embodiments, one or more operations in process 800 may be performed by the processing device 140b or an external processing device outside the imaging system 100. In the following descriptions, one or more operations of process 800 performed by the processing device 140a are merely provided for the purposes of illustration, and not intended to limit the scope of the present disclosure. In some embodiments, one or more operations in process 800 and one or more operations in process 500 may be performed by the same processing device (e.g., the processing device 140a).

In 802, one or more reference images may be obtained. In some embodiments, the processing device 140a (e.g., the obtaining module 402) may perform operation 802. In some embodiments, the reference image(s) may be obtained from one or more storage devices (e.g., the storage device 150, the storage 220, and/or the storage 390) associated with the imaging system 100 and/or an external data source accessible by the imaging system 100 via, e.g., the network 120. In some embodiments, the reference image(s) may be provided or selected by a user (e.g., a doctor, a radiologist, or the like) via a user interface. More descriptions of the reference images and the obtaining of the reference images may be found elsewhere in the present disclosure (e.g., FIG. 6 and descriptions thereof).

In 804, a first set of images generated by a first imaging device (e.g., the first imaging device that generates the original image) may be obtained. In some embodiments, the processing device 140a (e.g., the obtaining module 402) may perform operation 804. More descriptions of the first set of images and the obtaining of the first set of images may be found elsewhere in the present disclosure (e.g., FIG. 7 and descriptions thereof).

In 806, a second set of images generated by one or more second imaging devices may be obtained. In some embodiments, the processing device 140a (e.g., the obtaining module 402) may perform operation 806. More descriptions of the second set of images and the obtaining of the second set of images may be found elsewhere in the present disclosure (e.g., FIG. 7 and descriptions thereof).

In 808, an initial transformation model may be obtained. In some embodiments, the processing device 140a (e.g., the obtaining module 402) may perform operation 808. More descriptions of the initial transformation model and the obtaining of the initial transformation model may be found elsewhere in the present disclosure (e.g., FIG. 7 and descriptions thereof).

In 810, the target transformation model may be generated by training the initial transformation model using the first set of images, the second set of images, and/or the one or more reference images. In some embodiments, the processing device 140a (e.g., the generation module 406) may perform operation 810. In some embodiments, the initial transformation model may be trained using the first set of images and the second set of images to obtain a pre-trained transformation model (as illustrated in 708), and then the pre-trained transformation model may be further trained using the reference image(s) to obtain the target transformation model (as illustrated in 610). In some embodiments, the initial transformation model may be trained using the first set of images, and the reference image(s) (and/or the second set of images) to directly obtain the target transformation model. For example, in the training process, the first set of images and and the reference image(s) (and/or the second set of images) may be input into the initial transformation model, and one or more processed images (e.g., processed images generated based on the first set of images) may be generated as output of the initial transformation model.

In some embodiments, values of one or more loss functions may be determined by the processing device 140a based on the output of the initial transformation model and the reference image(s) (and/or the second set of images). If the first set of images and the reference image(s) (without the second set of images) are input into the initial transformation model, the values of the one or more loss functions may be determined based on the output and the reference image(s). If the first set of images, the reference image(s), and the second set of images are input into the initial transformation model, the values of the one or more loss functions may be determined based on the output, the reference image(s), and the second set of images. In some embodiments, the reference image(s) and the second set of images may be of different weights in the determination of the values of the one or more loss functions. For example, the reference image(s) may have a higher weight than the second set of images. The loss function(s) may relate to a degree of similarity between the style of the processed images and the style of the reference image(s) (and/or the second set of images). The value(s) of the loss function(s) may be compared with one or more thresholds. If the value(s) of the loss function(s) are less than the threshold(s), the training may terminate and the target transformation model may be determined. In some embodiments, the target transformation model may be stored in one or more storage devices (e.g., the storage device 150, the storage 220, and/or the storage 390) and/or an external data source accessible by the imaging system 100 via, e.g., the network 120. If the value(s) of the loss function(s) are larger than the threshold(s), the training process may continue such that one or more parameters of the initial transformation model may be further adjusted in a next iteration until the value(s) of the loss function(s) fall below the threshold(s). The threshold(s) may be determined by the imaging system 100, or may be preset by a user or operator via the terminal(s) 130. More descriptions of the training of the target transformation model may be found elsewhere in the present disclosure (e.g., FIGS. 6, 7, and 9-12 and descriptions thereof).

In some embodiments, the processing device 140a may obtain first information of the first imaging device, and/or second information of the at least one second imaging device. In some embodiments, the processing device 140a may train the initial transformation model based on the first set of images, the second set of images, the one or more reference images, the first information, and/or the second information. In some embodiments, the processing device 140a may associated the target transformation model with at least a portion of the first information, and/or at least a portion of the second information.

It should be noted that the above description of the process 800 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, operations 804 and 806 may be integrated into a single operation. As another example, operation 808 may be performed before or simultaneously with one or more of the operations 802-806. As a further example, operation 806 may be omitted. In some embodiments, the methods may be provided as an add-on to any new imaging device, providing imaging device manufacturer(s) and/or users the flexibility to conveniently adopt the methods as described herein without significant changes to the design or configurations of the new imaging device.

Figure 9:
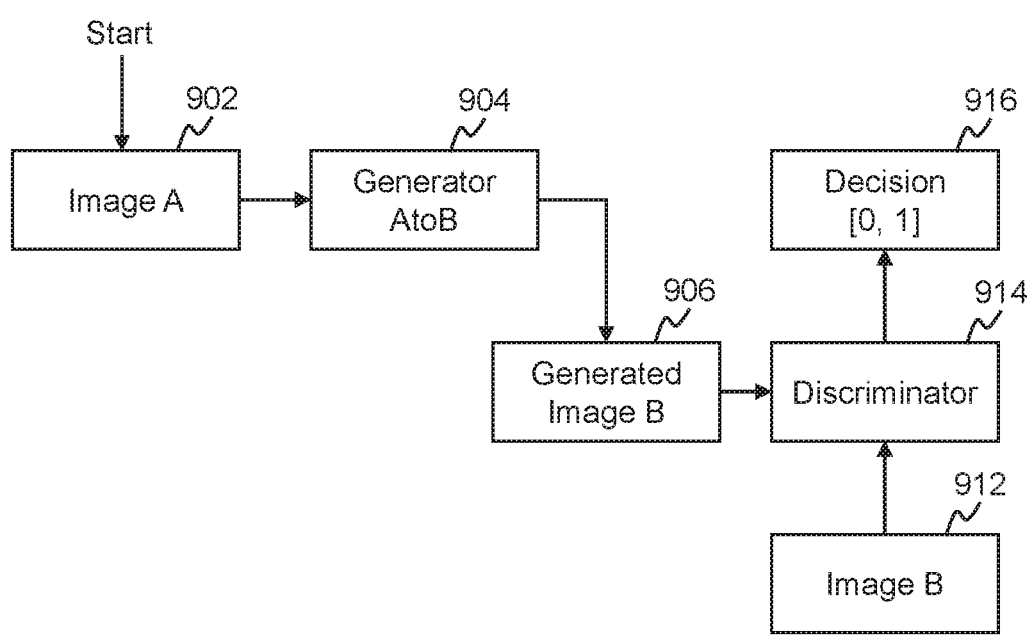
FIG. 9 is a block diagram illustrating an exemplary generative adversarial network (GAN) model according to some embodiments of the present disclosure.

FIG. 9 is a block diagram illustrating an exemplary generative adversarial network (GAN) model according to some embodiments of the present disclosure. In some embodiments, the target transformation model in FIG. 5 may be an GAN model shown in FIG. 9. In some embodiments, the GAN model may include a generative model (also referred to as a generator) and/or a discriminative model (also referred to as a discriminator). The generator may be configured to generate a transformed image. The discriminator may be configured to estimate a probability that an image comes from (or belongs to) a sample image rather than a transformed image generated by the generator. In some embodiments, the sample image may be an image generated by the first imaging device or the second imaging device, or obtained from a storage device, rather than an image generated by the generator. In some embodiments, an original image may be input into the generator, and the generator may produce a generated image based on the original image. The discriminator may discriminate the generated image from a sample image, and may determine a probability that the generated image comes from the sample image, and output a decision.

In a training process of the GAN model, a plurality of iterations may be performed to update generative parameters of the generator and discriminative parameters of the discriminator. In some embodiments, before training, the generative parameters and/or discriminative parameters may be assigned initial values (e.g., random values, initial values set by the imaging system 100 or preset by a user or operator via the terminal(s) 130, or initial values obtained according to a pre-training process). In one (e.g., each) of the plurality of iterations, an image A 902 (e.g., a random noise image, a sample image (of a first style) generated by the first imaging device) may be input into the generator AtoB 904, and the generator AtoB 904 may generate an image B (referred to as the generated image B 906) based on the image A 902. The discriminator 914 may discriminate the generated image B 906 from an image B 912 (e.g., a sample image (of a second style) generated by the second imaging device), and may determine a first probability that the generated image B 906 comes from a sample image, and/or a second probability that the image B 912 comes from a sample image, and output a decision 916. The probability relating to the decision 916 may have a value within [0, 1]. In some embodiments, the processing device 140 may determine a value of a first loss function of the discriminator 914 based on the generated image B 906 and the image B 912. In some embodiments, the first loss function may be determined according to Equation (1) shown below:

$$J^{(D)}(\theta^{(D)},\theta^{(G)})=-\tfrac{1}{2}E_{b\sim p_{data}}\log\ D(b)-\tfrac{1}{2}E_a\log(1-D(G(a))),\quad(1)$$

where $J^{(D)}$ may represent the first loss function of the discriminator 914, $\theta^{(D)}$ may represent discriminative parameter(s) of the discriminator 914, $\theta^{(G)}$ may represent generative parameter(s) of the generator AtoB 904, b may represent a sample image (e.g., an image generated by the second imaging device (e.g., the image B 912)), D(b) may represent the probability that the image B 912 comes from a sample image, $b\sim p_{data}$ may be a distribution of the image B 912, a may represent the image A 902, G(a) may represent the generated image B 906 (generated by the generator AtoB 904), D(G(a)) may represent the probability that the generated image B 906 comes from a sample image, $E_{b\sim p_{data}}$ may represent an average expectation value of sample images (by default, the expectation value of the sample images approximates to "1"), and $E_a$ may represent an average expectation value of generated images generated by the generator AtoB 904 (by default, the expectation value of the generated images approximates to "0").

In some embodiments, the processing device 140 may determine whether the value of the first loss function is less than a first threshold. The first threshold may be a value used to determine whether the discriminator 914 is satisfactory, that is, whether the generated image B 906 can be distinguished from the image B 912 (e.g., a sample image generated by the second imaging device). In some embodiments, the first threshold may be set (e.g., 0.5) according to default settings of the imaging system 100, or may be adjustable under different situations (e.g., the first threshold may be set according to a predetermined rule). In response to a determination that the value of the first loss function is less than the first threshold, the processing device 140 may determine and/or store the discriminative model. In response to a determination that the value of the first loss function is greater than the first threshold, the processing device 140 may perform a next iteration to update the discriminative parameters of the discriminator 914. For example, the processing device 140 may further update the discriminative parameters of the discriminative model until the value of the first loss function fall below the first threshold. It should be noted that, in response to a determination that the value of the first loss function is equal to the first threshold, the processing device 140 may either determine the discriminative model or perform a next iteration to update the discriminative parameters of the discriminator 914.

In some embodiments, the processing device 140 may further determine a value of a second loss function of the generator AtoB 904. In some embodiments, the second loss function may be determined according to Equation (2) shown below:

$$J^{(G)} = -\tfrac{1}{2} E_a \log D(G(a)), \quad (2)$$

where $J^{(G)}$ may represent the second loss function of the generative model.

In some embodiments, the processing device 140 may determine whether the value of the second loss function is less than a second threshold. The second threshold may be a value used to determine whether the generative model is satisfactory, that is, whether the generated image B 906 looks sufficiently similar to the image B 912 such that the discriminator 914 can not discriminate the generated image B 906 from the image B 912. In some embodiments, the second threshold may be set (e.g., 0.5) according to default settings of the imaging system 100, or may be adjustable under different situations. In some embodiments, the second threshold may be the same as the first threshold. In some embodiments, the second threshold may be different from the first threshold. In response to a determination that the value of the second loss function is less than the second threshold, the processing device 140 may determine and/or store the generative model. In response to a determination that the value of the second loss function is greater than the second threshold, the processing device 140 may perform a next iteration to further update the generative parameters of the generator AtoB 904. For example, the processing device 140 may update the generative parameters of the generator AtoB 904 until the value of the second loss function fall below the second threshold. It should be noted that, in response to a determination that the value of the second loss function is equal to the second threshold, the processing device 140 may either determine the generative model or perform a next iteration to update the generative parameters of the generator AtoB 904.

In some embodiments, if the value of the first loss function is less than the first threshold and the value of the second loss function is less than the second threshold, the processing device 140 may terminate the training process and finalize the GAN model. The obtained GAN model may be stored. In some embodiments, if the value of the first loss function exceeds the first threshold, and/or the value of the second loss function exceeds the second threshold, the processing device 140 may perform a next iteration to further update the discriminative parameter(s) of the discriminative model and/or the generative parameter(s) of the generative model. In some embodiments, the operations 610, 708, and/or 810 may be performed according to the training process illustrated in FIG. 9. For example, each of the first set of images may be used as the image A 902, and each of the second set of images (or each of the reference images) may be used as the image B 912.

Figure 10A:
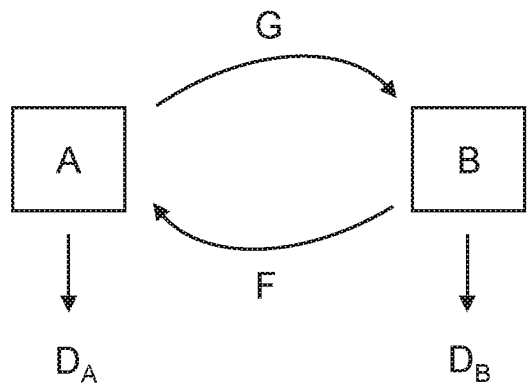
FIGS. 10A-10C are schematic diagrams illustrating a mechanism for a cycle-consistent adversarial network (cycle-GAN) model according to some embodiments of the present disclosure.
Figure 10B:
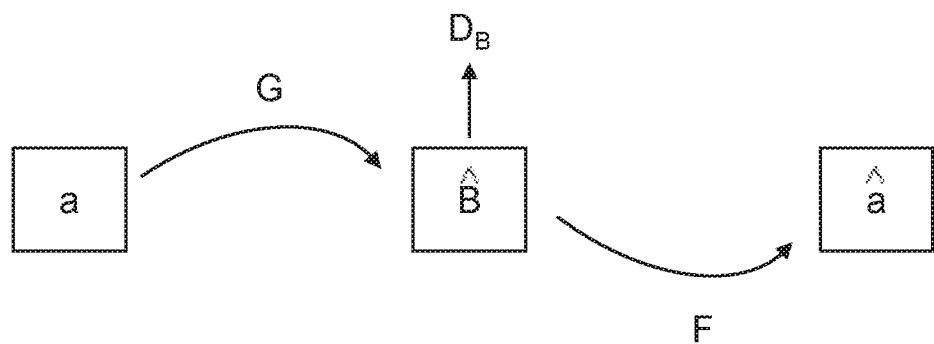
Figure 10C:
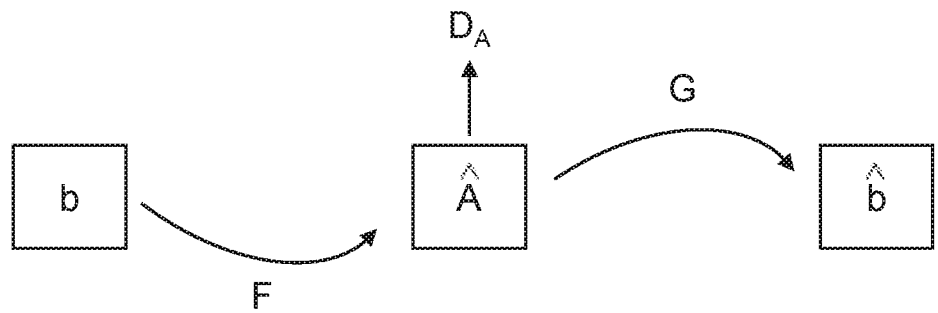

FIGS. 10A-10C are schematic diagrams illustrating a mechanism for a cycle-consistent adversarial network (cycle-GAN) model according to some embodiments of the present disclosure.

The cycle-GAN model may learn mapping functions between two domains A and B. The domain A may refer to an initial or original domain of an image, while the domain B may refer to a target domain. For example, an image (of a first style) generated by the first imaging device may be in the domain A, while an image (of a second style) generated by the second imaging device may be in the domain B. In some embodiments, the cycle-GAN model may include two GAN models. As shown in FIGS. 10A-10C, the cycle-GAN model may include two mapping functions, i.e., a first mapping function G: A→B and a second mapping function F: B→A. A mapping function may also be referred to as a generator. The generator G may be configured to transform an image in domain A to an image in domain B. The generator F may be configured to transform an image in domain B to an image in domain A. As shown in FIGS. 10A-10C, the cycle-GAN model may further include two discriminators, i.e., $D_A$ and $D_B$. The discriminator $D_A$ may be configured to distinguish between an image a and a transformed image F(b) (i.e., Â). The discriminator $D_B$ may be configured to distinguish between an image b and a transformed image G(a) (i.e., B̂).

In a learning (or training) process, two terms may be considered as an objective of the learning (or training). A first term may relate to adversarial losses for matching a distribution of a transformed image to a distribution of a sample image in the target domain. A second term may relate to cycle consistency losses used to prevent the mapping functions G and F from contradicting each other. For the first mapping function G: A→B and discriminator $D_B$, a first adversarial loss may be expressed as:

$$L_{GAN}(G, D_B, A, B) = E_{b \sim p_{data(b)}}[\log D_B(b)] + E_{a \sim p_{data(a)}}[\log(1 - D_B(G(a)))], \quad (3)$$

where $E_{b \sim p_{data(b)}}$ may represent an average expectation value of the image b (by default, the expectation value of the image b approximates to "1"), $E_{a \sim p_{data(a)}}$ may represent an average expectation value of the transformed image G(a) (i.e., B̂) (by default, the expectation value of the transformed image G(a) approximates to "0"), the generator G may be configured to generate an image G(a) that looks similar to an image from the domain B, while the discriminator $D_B$ may be configured to distinguish between a transformed image G(a) and a sample image b in the domain B.

For the second mapping function F: B→A and discriminator $D_A$, a second adversarial loss may be expressed as:

$$L_{GAN}(F, D_A, B, A) = E'_{a \sim p_{data(a)}}[\log D_A(a)] + E'_{b \sim p_{data(b)}}[\log(1 - D_A(F(b)))], \quad (4)$$

where $E'_{a \sim p_{data(a)}}$ may represent an average expectation value of the image a (by default, the expectation value of the image a approximates to "1"), $E'_{b \sim p_{data(b)}}$ may represent an average expectation value of the transformed image F(b) (i.e., Â) (by default, the expectation value of the transformed image F(b) approximates to "0"), the generator F may be configured to generate an image F(b) that looks similar to an image from the domain A, while the discriminator $D_A$ may be configured to distinguish between a transformed image F(b) and a sample image a in the domain A.

In some embodiments, in the learning (or training) process, the mapping functions G and F may be cycle-consistent. As shown in FIG. 10B, for the image a from the domain A, the image transformation cycle may need to be able to bring a back to the original image, i.e., a→G(a)→F(G(a))≈a, which may be referred to as a forward cycle consistency. As shown in FIG. 10C, for the image b from the domain B, the mapping functions F and G may need to satisfy a backward cycle consistency, i.e., b→F(b)→G(F(b))≈b. In the learning (or training) process, a forward cycle consistency loss and a backward cycle consistency loss may be considered. The forward cycle consistency loss may be determined based on a difference between the image a and the transformed image F(G(a)). The backward cycle consistency loss may be determined based on a difference between the image b and the transformed image G(F(b)). In some embodiments, the the forward cycle consistency loss and the backward cycle consistency loss may be determined separately. In some embodiments, the relationship between the forward cycle consistency loss and the backward cycle consistency loss may be described in a single equation, e.g., $$L_{cyl}(G,F)=E_{a-p_{data}(a)}[\|F(G(a))-a\|_1]+E_{b-p_{data}(b)}[\|G(F(b))-b\|_1] \quad (5)$$

Figure 11A:
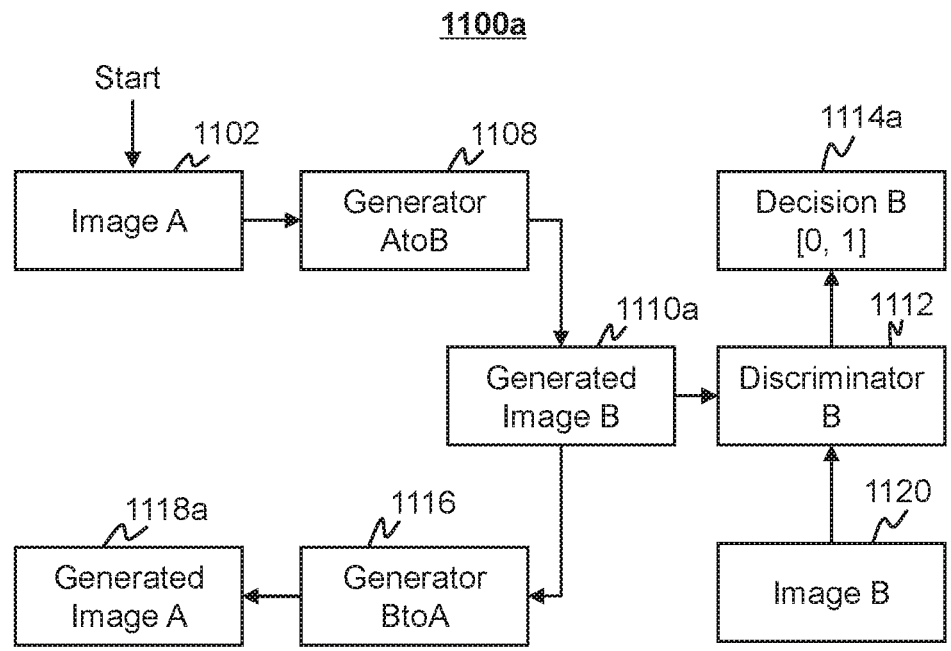
FIGS. 11A and 11B are block diagrams illustrating an exemplary cycle-consistent adversarial network (cycle-GAN) model according to some embodiments of the present disclosure.
Figure 11B:
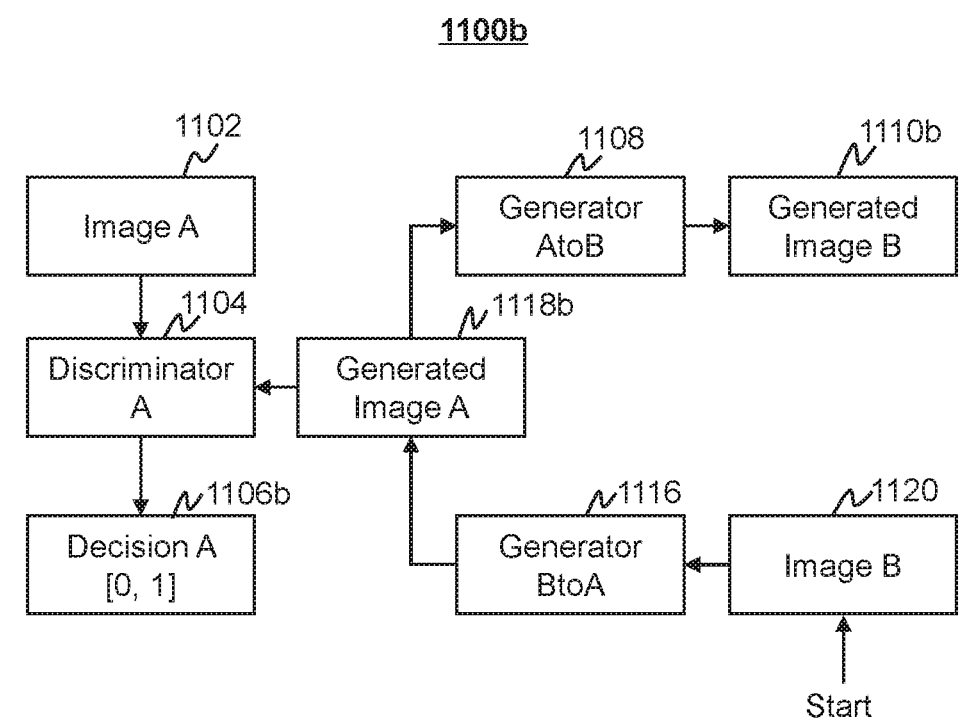

More descriptions of the learning (or training) process of the cycle-GAN model may be found elsewhere in the present disclosure (e.g., FIGS. 11A-11B and descriptions thereof).

FIGS. 11A and 11B are block diagrams illustrating an exemplary cycle-consistent adversarial network (cycle-GAN) model according to some embodiments of the present disclosure. In some embodiments, as illustrated in FIGS. 10A-10C, the cycle-GAN model may include two GAN models. In some embodiments, as shown in FIGS. 11A and 11B, the two GAN models (e.g., the first GAN model 1100a, the second GAN model 1100b) may be mirror symmetric. In some embodiments, the two GAN models may share two generators (e.g., the generator AtoB 1108, the generator BtoA 1116). In some embodiments, the two GAN models may each have a corresponding discriminator (e.g., the discriminator A 1104 for the second GAN model 1100b, the discriminator B 1112 for the first GAN model 1100a), respectively. The generator AtoB 1108 may be configured to generate, based on an image in domain A, a transformed image (in domain B) that looks similar to a sample image in the domain B. The discriminator A 1104 may be configured to distinguish between a transformed image in the domain A and a sample image in the domain A. The generator BtoA 1116 may be configured to generate, based on an image in domain B, a transformed image (in domain A) that looks similar to a sample image in the domain A. The discriminator B 1112 may be configured to distinguish between a transformed image in the domain B and a sample image in the domain B. A sample image may be an image generated by the first imaging device or the second imaging device, or obtained from a storage device, rather than an image generated by the generator AtoB 1108 or the generator BtoA 1116.

In a training process of the cycle-GAN model, a plurality of iterations may be performed to update generative parameters of the generators and discriminative parameters of the discriminators. In some embodiments, before training, the generative parameters and/or discriminative parameters may be assigned initial values (e.g., random values, initial values set by the imaging system 100 or preset by a user or operator via the terminal(s) 130, or initial values obtained according to a pre-training process). In one (e.g., each) of the plurality of iterations, an image A 1102 (e.g., a random noise image, a sample image (of a first style) generated by the first imaging device) (in domain A) may be input into the generator AtoB 1108, and the generator AtoB 1108 may produce a generated image B 1110a (in domain B) based on the image A 1102. The discriminator B 1112 may discriminate the generated image B 1110a from an image B 1120 (e.g., a sample image (of a second style) generated by the second imaging device), and may determine a first probability that the generated image B comes from a sample image, and/or a second probability that the image B 1120 comes from a sample image, and output a decision B 1114a. The probability relating to the decision B 1114a may have a value within [0, 1]. In some embodiments, the processing device 140 may determine a first adversarial loss (see Equation (3)) of the discriminator B 1112 based on the generated image B 1110a and the image B 1120. In some embodiments, the generated image B 1110a may be input into the generator BtoA 1116, and a generated image A 1118a (in domain A) may be obtained. In some embodiments, the processing device 140 may determine a forward cycle consistency loss (see Equation (5)) based on the generated image A 1118a and the image A 1102.

Similarly, the image B 1120 (e.g., a random noise image, a sample image (of a second style) generated by the second imaging device) (in domain B) may be input into the generator BtoA 1116, and the generator BtoA 1116 may produce a generated image A 1118b (in domain A) based on the image B 1120. The discriminator A 1104 may discriminate the generated image A 1118b from the image A 1102 (e.g., a sample image (of a first style) generated by the first imaging device), and may determine a first probability that the generated image A 1118b comes from a sample image, and/or a second probability that the image A 1102 comes from a sample image, and output a decision A 1106b. The probability relating to the decision A 1106b may have a value within [0, 1]. In some embodiments, the processing device 140 may determine a second adversarial loss (see Equation (4)) of the discriminator A 1104 based on the generated image A 1118b and the image A 1102. In some embodiments, the generated image A 1118b may be input into the generator AtoB 1108, and a generated image B 1110b (in domain B) may be obtained. In some embodiments, the processing device 140 may determine a backward cycle consistency loss (see Equation (5)) based on the generated image B 1110b and the image B 1120.

In some embodiments, the processing device 140 may determine whether the first adversarial loss is less than a first threshold. The first threshold may be a value used to determine whether the discriminator B 1112 is satisfactory, that is, whether the generated image B 1110a can be distinguished from the image B 1120 (e.g., a sample image generated by the second imaging device). In some embodiments, the first threshold may be default settings (e.g., 0.5) of the imaging system 100, or may be adjustable under different situations. In response to a determination that the first adversarial loss is less than the first threshold, the processing device 140 may determine and/or store the discriminator B 1112. In response to a determination that the first adversarial loss is greater than the first threshold, the processing device 140 may perform a next iteration to update the discriminative parameters of the discriminator B 1112. For example, the processing device 140 may further update the discriminative parameters of the discriminator B 1112 until the first adversarial loss fall below the first threshold. It should be noted that, in response to a determination that the first adversarial loss is equal to the first threshold, the processing device 140 may either determine the discriminator B 1112 or perform a next iteration to update the discriminative parameters of the discriminator B 1112.

In some embodiments, the processing device 140 may determine whether the second adversarial loss is less than a second threshold. The second threshold may be a value used to determine whether the discriminator A 1104 is satisfactory, that is, whether the generated image A 1118b can be distinguished from the image A 1102 (e.g., a sample image generated by the first imaging device). In some embodiments, the second threshold may be default settings (e.g., 0.5) of the imaging system 100, or may be adjustable under different situations. In response to a determination that the second adversarial loss is less than the second threshold, the processing device 140 may determine and/or store the discriminator A 1104. In response to a determination that the second adversarial loss is greater than the second threshold, the processing device 140 may perform a next iteration to update the discriminative parameters of the discriminator A 1104. For example, the processing device 140 may update the discriminative parameters of the discriminator A 1104 until the second adversarial loss fall below the second threshold. It should be noted that, in response to a determination that the second adversarial loss is equal to the second threshold, the processing device 140 may either finalize the discriminator A 1104 or perform a next iteration to update the discriminative parameters of the discriminator A 1104.

In some embodiments, the processing device 140 may determine whether the forward cycle consistency loss is less than a third threshold. In some embodiments, the processing device 140 may determine whether the backward cycle consistency loss is less than a fourth threshold. Alternatively, in some embodiments, the processing device 140 may determine whether a cycle consistency loss (e.g., a sum of the forward cycle consistency loss and the backward cycle consistency loss) is less than a fifth threshold. The third threshold may be a value used to determine whether the generator AtoB 1108 is satisfactory, that is, whether the generated image B 1110a looks sufficiently similar to the image B 1120 such that the discriminator B 1112 can not discriminate the generated image B 1110a from the image B 1120. The fourth threshold may be a value used to determine whether the generator BtoA 1116 is satisfactory, that is, whether the generated image A 1118b looks sufficiently similar to the image A 1102 such that the discriminator A 1104 can not discriminate the generated image A 1118b from the image A 1102. The fifth threshold may be a value used to determine whether both the generator AtoB 1108 and the generator BtoA 1116 are satisfactory. In some embodiments, the third, fourth, and/or fifth threshold may be set (e.g., 0.5) according to default settings of the imaging system 100, or may be adjustable under different situations. In response to a determination that the forward cycle consistency loss is less than the third threshold, the processing device 140 may determine and/or store the generator AtoB 1108. In response to a determination that the backward cycle consistency loss is less than the fourth threshold, the processing device 140 may determine and/or store the generator BtoA 1116. Alternatively, in response to a determination that a sum of the forward cycle consistency loss and the backward cycle consistency loss is less than the fifth threshold, the processing device 140 may determine and/or store the generator AtoB 1108 and the generator BtoA 1116. In response to a determination that the forward cycle consistency loss is greater than the third threshold (or the backward cycle consistency loss is greater than the fourth threshold, or the sum of the forward cycle consistency loss and the backward cycle consistency loss is greater than the fifth threshold), the processing device 140 may perform a next iteration to update the generative parameters of the generator AtoB 1108 and the generator BtoA 1116. For example, the processing device 140 may update the generative parameters of the generator AtoB 1108 and the generator BtoA 1116 until the forward cycle consistency loss fall below the third threshold, and the backward cycle consistency loss is less than the fourth threshold (or the sum of the forward cycle consistency loss and the backward cycle consistency loss is less than the fifth threshold). It should be noted that, in response to a determination that the forward cycle consistency loss is equal to the third threshold (or the backward cycle consistency loss is equal to the fourth threshold, or the sum of the forward cycle consistency loss and the backward cycle consistency loss is equal to the fifth threshold), the processing device 140 may either determine the generator AtoB 1108 (and/or the generator BtoA 1116) or perform a next iteration to update the generative parameters of the generator AtoB 1108 (and/or the generator BtoA 1116).

In some embodiments, the first GAN model 1100a and the second GAN model 1100b may be trained simultaneously. For example, the image A 1102 and image B 1120 may be input into the generator AtoB 1108 and the generator BtoA 1116, respectively and simultaneously. In some embodiments, the operations 610, 708, and/or 810 may be performed according to the training process illustrated in FIGS. 11A and 11B. For example, each of the first set of images may be used as the image A 1102, and each of the second set of images (or each of the reference images) may be used as the image B 1120.

Figure 12:
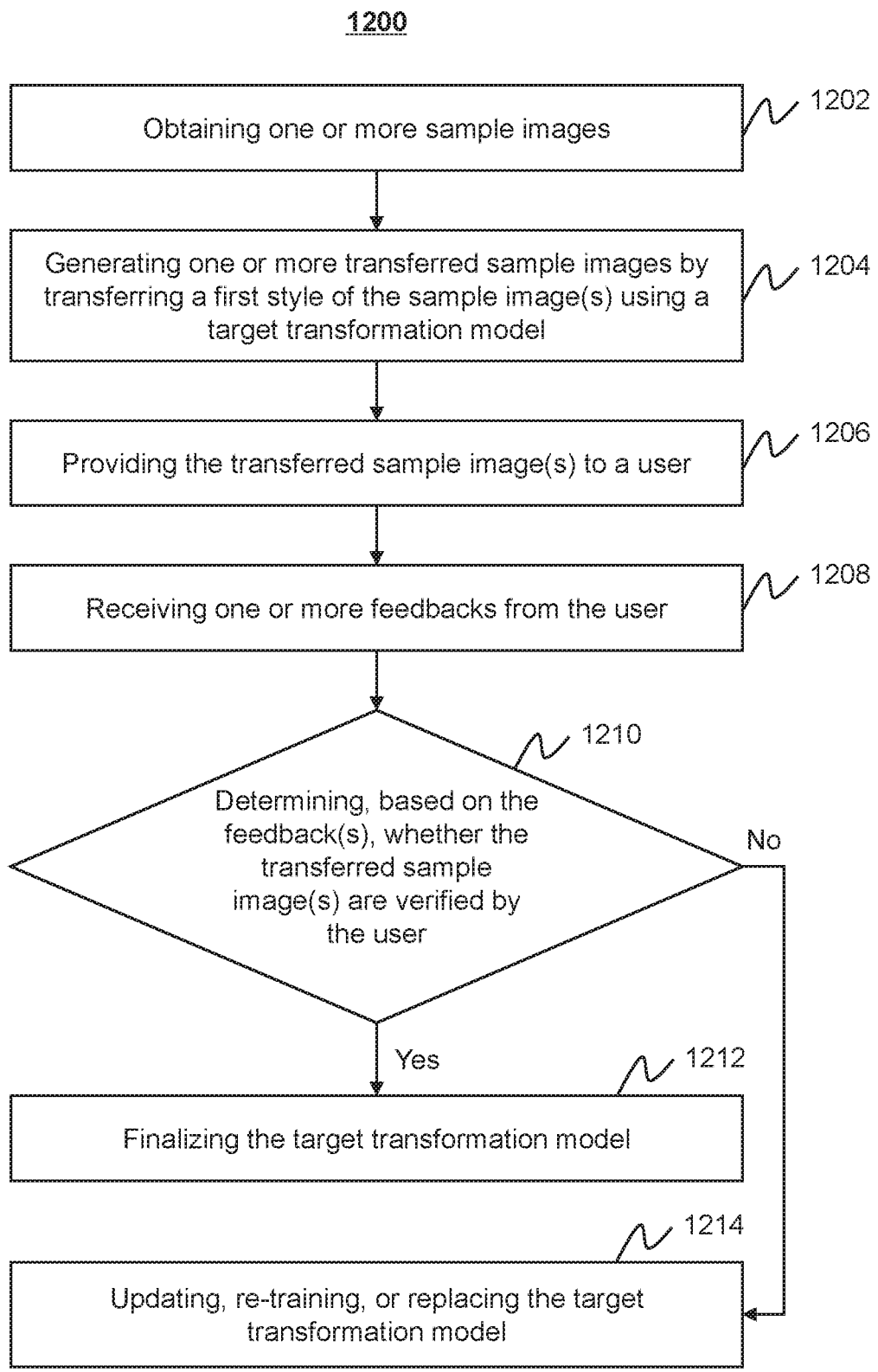
FIG. 12 is a flowchart illustrating an exemplary process for determining a target transformation model based on a feedback from a user according to some embodiments of the present disclosure.

FIG. 12 is a flowchart illustrating an exemplary process for determining a target transformation model based on a feedback from a user according to some embodiments of the present disclosure. In some embodiments, the process 1200 may be executed by the imaging system 100. For example, the process 1200 may be implemented as a set of instructions (e.g., an application) stored in one or more storage devices (e.g., the storage device 150, the storage 220, and/or the storage 390) and invoked and/or executed by the processing device 140 (implemented on, for example, the processor 210 of the computing device 200, and the CPU 340 of the mobile device 300). The operations of the process 1200 presented below are intended to be illustrative. In some embodiments, the process may be accomplished with one or more additional operations not described, and/or without one or more of the operations discussed. Additionally, the order in which the operations of the process 1200 as illustrated in FIG. 12 and described below is not intended to be limiting. In some embodiments, one or more operations in process 1200 may be performed by the processing device 140a. In some embodiments, one or more operations in process 1200 may be performed by the processing device 140b or an external processing device outside the imaging system 100. In the following descriptions, one or more operations of process 1200 performed by the processing device 140a are merely provided for the purposes of illustration, and not intended to limit the scope of the present disclosure. In some embodiments, one or more operations in process 1200 and one or more operations in process 500 may be performed by the same processing device (e.g., the processing device 140a). In some embodiments, one or more operations in process 1200 may be performed before the process 500.

In 1202, one or more sample images may be obtained. In some embodiments, the processing device 140a (e.g., the obtaining module 402) may perform operation 1202. The sample image(s) may be used to test whether the target transformation model meet the need(s) of the user. In some embodiments, the sample image(s) may be generated by a first imaging device of a first model. In some embodiments, the sample image(s) may have be of the same style. In some embodiments, the sample image(s) may be of the first style. In some embodiments, the sample image(s) and the original image obtained in 502 may be of a same style. In some embodiments, the sample image(s) and the original image may correspond to same scan region(s) or different scan regions. In some embodiments, the sample image(s) may include the original image. The sample image(s) may be obtained similarly to how the original image is obtained as described with respect to 502, and relevant descriptions of which are not repeated here.

In 1204, one or more transferred sample images may be generated by transferring a first style of the sample image(s) using a target transformation model. In some embodiments, the processing device 140a (e.g., the generation module 406) may perform operation 1204. The first style of the sample image may refer to a style of the sample image before being transferred. The transferred sample image(s) may have the second style. In some embodiments, the target transformation model used in 1204 may be the same as or similar to the target transformation model determined in 504. In some embodiments, the target transformation model used in 1204 may have a same structure as the target transformation model determined in 504. In some embodiments, the target transformation model used in 1204 may have one or more different parameters compared to the target transformation model determined in 504. For example, the target transformation model determined in 504 may be more customized than the target transformation model used in 1204 (e.g., the target transformation model in 504 may be determined based on more information specified by the user in comparison with the target transformation model used in 1204). In some embodiments, the transferred sample image may have a substantially same style as or similar style to the target style. More descriptions of the target style may be found elsewhere in the present disclosure (e.g., FIG. 5 and descriptions thereof). In some embodiments, the processing device 140a may determine the target transformation model, as described in 504 before transferring the first style of the sample image(s). The first style of the sample image(s) may be transformed similarly to how the first style of the original image is transformed as described in connection with 506, and relevant descriptions of which are not repeated here.

In 1206, the transferred sample image(s) may be provided to a user. In some embodiments, the processing device 140a (e.g., the transmission module 408) may perform operation 1206. In some embodiments, the transferred sample image(s) may be provided to the user via the user interface. The transferred sample image(s) may be provided similarly to how the transferred image is provided as described with respect to 508, and relevant descriptions of which are not repeated here.

In 1208, one or more feedbacks may be received from the user. In some embodiments, the processing device 140a (e.g., the transmission module 408) may perform operation 1208. In some embodiments, the user may provide a feedback to each transferred sample image. In some embodiments, the feedback(s) may be provided by the user via the user interface and received by the processing device 140a. A feedback may include a verification result of a transferred sample image of the user. For example, the user interface may present one or more options (such as "Quite satisfied," "Satisfied," "Acceptable," "Dissatisfied," and "Quite dissatisfied") for the user. Merely by way of example, the user can pick an option via the user interface based on how s/he is satisfied by the transferred image. As another example, the user interface may present a scoring request to the user. In some embodiments, the user may grade each transferred sample image by inputting a score (e.g., 80 of a centesimal system) on a touchscreen or using a keyboard, dragging a trackbar on a touchscreen or using a mouse, choosing a number of stars (e.g., one star may represent "Quite dissatisfied", while five stars may represent "Quite satisfied"), or the like. In some embodiments, the feedback(s) may be transmitted to the processing device 140a, and the processing device 140a may perform one or more subsequent operations.

In 1210, the processing device 140a (e.g., the determination module 404) may determine, based on the feedback(s), whether the transferred sample image(s) are verified by the user. If the transferred sample image(s) are verified by the user, the process 1200 may proceed to 1212. In 1212, the processing device 140a (e.g., the determination module 404) may finalize the target transformation model. If a count or proportion of transferred image(s) rejected by the user exceeds a threshold, the process 1200 may proceed to 1214. In 1214, the processing device 140a (e.g., the determination module 404) may further update, re-train, or replace the target transformation model. For example, if the count or proportion of transferred image(s) (to which the feedback is "Quite dissatisfied") exceeds a threshold, the processing device 140a may repeat operations 602-610 to update at least a portion of the first information, at least a portion of the second information, the pre-trained transformation model, at least a portion of the reference images, and/or update the target transformation model. As another example, if the count or proportion of transferred image(s) (to which the feedback is "Dissatisfied") exceeds a threshold, the processing device 140a may repeat one or more of operations 602-610 to replace the pre-trained transformation model, and/or the target transformation model. As a further example, if the count or proportion of transferred image(s) (to which the feedback is "Acceptable") exceeds a threshold, the processing device 140a may repeat one or more of operations 608-610 to update at least a portion of the reference images, and/or re-train the target transformation model.

In some embodiments, after training, the target transformation model may be stored in one or more storage devices (e.g., the storage device 150, the storage 220, and/or the storage 390) associated with the imaging system 100 and/or an external data source (e.g., a database associated with or specified by the manufacturer of the first imaging device). In some embodiments, the target transformation model may be updated automatically after a periodic time (such as a week, a month, a quarter, a year, or the like). In some embodiments, the updating of the target transformation model may be triggered by the user.

It should be noted that the above description of the process 1200 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, operations 1208 and 1210 may be integrated into a single operation. As another example, operation 1214 may be divide into three operations of updating, replacing, and re-training the target transformation model according to the feedback of the user.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method implemented on at least one machine each of which has at least one processor and at least one storage device for image processing, the method comprising:
   obtaining an original image of a first style, the original image being generated by a first imaging device;
   obtaining a target transformation model, including:
      obtaining at least one of information of a second imaging device, login information of a user, a scanning protocol of the original image, or a scan region of the original image; and
      determining the target transformation model based on the at least one of the information of the second imaging device, the login information of the user, the scanning protocol of the original image, or the scan region of the original image;
   generating a transferred image of a second style by transferring the first style of the original image using the target transformation model, wherein a difference between the second style and a target style of one or more other images generated by the second imaging device is less than a preset variation of the target style, and the second style is different from the first style; and
   performing at least one operation of modifying the transferred image or providing the transferred image to the user for presentation;
   wherein the determining the target transformation model including at least one of:
      selecting, according to the information of the second imaging device, from two or more trained transformation models, the target transformation model corresponding to the target style;
      identifying, according to the login information of the user, from the two or more trained transformation models, a trained transformation model corresponding to the user as the target transformation model;
      identifying, according to the scanning protocol of the original image, from the two or more trained transformation models, the target transformation model corresponding to the scan region of the scanning protocol; or
      identifying, according to the scan region, from the two or more trained transformation models, the target transformation model corresponding to the scan region.

2. The method of claim 1, wherein the obtaining an original image comprises:
   obtaining the original image based on a first instruction of the user, the first instruction including information of the target style specified by the user via a user interface.

3. The method of claim 1, wherein the obtaining at least one of information of a second imaging device, login information of a user, a scanning protocol of the original image, or a scan region of the original image comprises:
   obtaining, via a user interface, the information of the second imaging device.

4. The method of claim 1, wherein the determining the target transformation model further comprises:
   determining the target transformation model based on a second instruction of the user, the second instruction being associated with one or more trained transformation models provided or selected by the user via a user interface.

5. The method of claim 1, wherein the obtaining at least one of information of a second imaging device, login information of a user, a scanning protocol of the original image, or a scan region of the original image comprises:
   recognizing the scan region of the original image.

6. The method of claim 1, wherein the target transformation model is generated according to a first process, the first process including:
   obtaining first information associated with the first imaging device that generates the original image;
   obtaining second information associated with at least one second imaging device, wherein the at least one second imaging device generates images to which the user is accustomed;
   determining a pre-trained transformation model based on at least a portion of the first information or at least a portion of the second information;
   obtaining one or more reference images; and
   generating the target transformation model by training, based on at least a portion the first information or at least a portion the second information, the pre-trained transformation model using the one or more reference images.

7. The method of claim 6, wherein the pre-trained transformation model is generated according to a second process, the second process including:
   obtaining a first set of images generated by the first imaging device;
   obtaining a second set of images generated by one or more of the at least one second imaging device;
   obtaining an initial transformation model; and
   generating the pre-trained transformation model by training the initial transformation model using the first set of images and the second set of images.

8. The method of claim 6, wherein the first information includes at least one of
   a model identification number of the first imaging device; or
   one or more settings relating to an image style associated with the first imaging device provided by the user.

9. The method of claim 8, wherein the one or more settings include an amount or extent of image style transformation from the first style to a target style or to the second style.

10. The method of claim 6, wherein the second information includes at least one of
    a model identification number of each of the at least one second imaging device;
    a time length that the user has been using each of the at least one second imaging device; or
    a ranking of the at least one second imaging device based on a preference of the user.

11. The method of claim 1, wherein the target transformation model is generated according to a third process, the third process including:
    obtaining one or more reference images;
    obtaining a first set of images generated by the first imaging device that generates the original image;
    obtaining a second set of images generated by at least one second imaging device, wherein the at least one second imaging device generates images to which the user is accustomed;
    obtaining an initial transformation model; and
    generating the target transformation model by training the initial transformation model using the first set of images, the second set of images, and the one or more reference images.

12. The method of claim 11, wherein the third process further includes:
    obtaining first information of the first imaging device;
    obtaining second information of the at least one second imaging device; and training, based on the first information or the second information, the initial transformation model.

13. The method of claim 1, wherein the obtaining a target transformation model comprises:
   obtaining a sample image of the first style;
   generating a transferred sample image of the second style by transferring the first style of the sample image using the target transformation model;
   providing the transferred sample image to the user via a user interface;
   receiving a feedback from the user via the user interface;
   determining, based on the feedback, whether the transferred sample image is verified by the user; and
   in response to a determination that the transferred sample image is verified by the user, finalizing the target transformation model; or
   in response to a determination that the transferred sample image is rejected by the user, updating, re-training, or replacing the target transformation model.

14. The method of claim 1, wherein the target transformation model is a generative adversarial network (GAN) model or a cycle-GAN model.

15. A system for image processing, comprising:
   at least one storage device storing a set of instructions; and
   at least one processor in communication with the storage device, wherein when executing the set of instructions, the at least one processor is configured to cause the system to perform operations including:
   obtaining a target transformation model, including:
      obtaining at least one of information of a second imaging device, login information of a user, a scanning protocol of the original image, or a scan region of the original image; and
      determining the target transformation model based on the at least one of the information of the second imaging device, the login information of the user, the scanning protocol of the original image, or the scan region of the original image;
   generating a transferred image of a second style by transferring the first style of the original image using the target transformation model, wherein a difference between the second style and a target style of one or more other images generated by the second imaging device is less than a preset variation of the target style, and the second style is different from the first style; and
   performing at least one operation of modifying the transferred image or providing the transferred image to the user for presentation;
   wherein the determining the target transformation model including at least one of:
      selecting, according to the information of the second imaging device, from two or more trained transformation models, the target transformation model corresponding to the target style;
      identifying, according to the login information of the user, from the two or more trained transformation models, a trained transformation model corresponding to the user as the target transformation model;
      identifying, according to the scanning protocol of the original image, from the two or more trained transformation models, the target transformation model corresponding to the scan region of the scanning protocol; or
      identifying, according to the scan region, from the two or more trained transformation models, the target transformation model corresponding to the scan region.

16. A non-transitory computer readable medium storing instructions, the instructions, when executed by at least one processor, causing the at least one processor to implement a method comprising:
   obtaining a target transformation model, including:
      obtaining at least one of information of a second imaging device, login information of a user, a scanning protocol of the original image, or a scan region of the original image; and
      determining the target transformation model based on the at least one of the information of the second imaging device, the login information of the user, the scanning protocol of the original image, or the scan region of the original image;
   generating a transferred image of a second style by transferring the first style of the original image using the target transformation model, wherein a difference between the second style and a target style of one or more other images generated by the second imaging device is less than a preset variation of the target style, and the second style is different from the first style; and
   performing at least one operation of modifying the transferred image or providing the transferred image to the user for presentation;
   wherein the determining the target transformation model including at least one of:
      selecting, according to the information of the second imaging device, from two or more trained transformation models, the target transformation model corresponding to the target style;
      identifying, according to the login information of the user, from the two or more trained transformation models, a trained transformation model corresponding to the user as the target transformation model;
      identifying, according to the scanning protocol of the original image, from the two or more trained transformation models, the target transformation model corresponding to the scan region of the scanning protocol; or
   identifying, according to the scan region, from the two or more trained transformation models, the target transformation model corresponding to the scan region.

* * * * *